US009537954B2

(12) United States Patent
Ranasinghe et al.

(10) Patent No.: US 9,537,954 B2
(45) Date of Patent: Jan. 3, 2017

(54) METHOD AND APPARATUS FOR BIOLOGICALLY INSPIRED AUTONOMOUS INFRASTRUCTURE MONITORING

(71) Applicant: EpiSys Science, Inc., Poway, CA (US)

(72) Inventors: Nadeesha Oliver Ranasinghe, Torrance, CA (US); Bong Kyun Ryu, Poway, CA (US); Wei-Min Shen, Rancho Palos Verdes, CA (US)

(73) Assignee: EpiSys Science, Inc., Poway, CA (US)

( * ) Notice: Subject to any disclaimer, the term of this patent is extended or adjusted under 35 U.S.C. 154(b) by 0 days.

(21) Appl. No.: 14/716,852

(22) Filed: May 19, 2015

(65) Prior Publication Data

US 2015/0332523 A1    Nov. 19, 2015

Related U.S. Application Data

(60) Provisional application No. 62/000,398, filed on May 19, 2014, provisional application No. 62/000,450, filed on May 19, 2014.

(51) Int. Cl.
*G07C 5/02* (2006.01)
*H04L 29/08* (2006.01)
(Continued)

(52) U.S. Cl.
CPC ............ *H04L 67/12* (2013.01); *G07C 5/02* (2013.01); *G07C 5/08* (2013.01); *H04W 4/021* (2013.01);
(Continued)

(58) Field of Classification Search
CPC ...... H04W 84/18; H04W 40/20; H04W 40/38; H04W 80/00; G01V 1/003; H04L 1/00; H04L 2201/00
(Continued)

(56) References Cited

U.S. PATENT DOCUMENTS

2003/0119508 A1* 6/2003 Gwon .................. H04W 36/30
455/436
2004/0121786 A1* 6/2004 Radcliffe ............... G01V 1/003
455/500
(Continued)

OTHER PUBLICATIONS

A. Graves, G. Wayne and I. Danihelka, Neural Turing Machines, epring arXiv:1410.5401 "Neural and Evolutionary Computing" 2014, pp. 1-26.
(Continued)

*Primary Examiner* — Behrang Badii
*Assistant Examiner* — Sanjeev Malhotra
(74) *Attorney, Agent, or Firm* — Arent Fox LLP

(57) ABSTRACT

A method and apparatus are provided for autonomously detecting and reporting anomalies in actions of an autonomous mobile node, or in behaviors of a swarm of autonomous mobile nodes to an operator. The autonomous mobile node may experience anomalies or unexpected situations due to various failures or external influence (e.g. natural weather phenomena, enemy threats). During a training phase a prediction model and a structured model may be established from measurement data received from one or more sensors of an autonomous mobile node or a swarm of nodes while executing an action or behavior under normal circumstances. A prediction model forecasts the expected outcome of an action or behavior, and structured model helps quantify the similarity of a learned action or behavior to the currently observed situation. Based on the measurement data applicable models can be used for an action or behavior for anomaly detection in the action or behavior.

20 Claims, 27 Drawing Sheets

(51) Int. Cl.

| | |
|---|---|
| *H04W 76/04* | (2009.01) |
| *H04W 72/04* | (2009.01) |
| *H04W 24/10* | (2009.01) |
| *H04W 4/02* | (2009.01) |
| *H04W 76/02* | (2009.01) |
| *G07C 5/08* | (2006.01) |
| *H04W 40/24* | (2009.01) |
| *H04W 84/18* | (2009.01) |
| *H04W 84/00* | (2009.01) |
| *G05D 1/00* | (2006.01) |
| *G06K 9/62* | (2006.01) |

(52) U.S. Cl.
CPC ............ *H04W 4/023* (2013.01); *H04W 24/10* (2013.01); *H04W 40/248* (2013.01); *H04W 72/0406* (2013.01); *H04W 76/021* (2013.01); *H04W 76/045* (2013.01); *G05D 1/00* (2013.01); *G06K 9/6297* (2013.01); *H04W 84/005* (2013.01); *H04W 84/18* (2013.01)

(58) Field of Classification Search
USPC ........ 455/436, 500; 370/254, 328, 331, 338; 709/224
See application file for complete search history.

(56) References Cited

U.S. PATENT DOCUMENTS

| | | | | |
|---|---|---|---|---|
| 2006/0072505 A1* | 4/2006 | Carrillo | ................ | H04L 41/042 370/331 |
| 2006/0221891 A1* | 10/2006 | Schmitz | ................ | H04L 12/189 370/328 |
| 2007/0038743 A1* | 2/2007 | Hellhake | ........... | H04L 29/12283 709/224 |
| 2007/0297374 A1* | 12/2007 | El-Damhougy | ...... | H04W 40/24 370/338 |
| 2010/0265846 A1* | 10/2010 | Weniger | ................. | H04L 45/04 370/254 |

OTHER PUBLICATIONS

A. Stout, G. Konidaris, G. Barto, Intrinsically Motivated Reinforcement Learning: A Promising Framework for Developmental Robot Learning, AAAI Spring Symposium on Developmental Robotics, 2005, pp. 1-6.

D.H. Nguyen, B. Widrow, Neural networks for self-learning control systems, IEEE Control Systems Magazine, pp. 18-23, Apr. 1990.

G. E. Hinton, S. Osindero, and Y. Teh, A fast learning algorithm for deep belief nets, Neural Computation, 18, pp. 1527-1554, 2006.

Jing Xiao, Book Review: by S. Nolfi, D. Floreano, "Evolutionary robotics: The biology, intelligence, and technology of self-organizing machines, MIT Press, Cambridge, MA, 2000, IEEE Transactions on Evolutionary Computation, vol. 5, No. 4, Aug. 2001."

K. Doya., K. Samejima, K. Katagiri, M. Kawato, Multiple Model-based Reinforcement Learning, Journal of Neural Computation, 2002, pp. 1-37.

K. F. Man, K. S. Tang, S. Kwong, Genetic Algorithms: Concepts and Applications, IEEE Transactions on Industrial Electronics, pp. 519-534, 1996.

N. Ranasinghe and W-M Shen, Autonomous Surveillance Tolerant to Interference, Towards Autonomous Robotics Systems Conference, TAROS 2012, pp. 73-83, Aug. 2012.

N. Ranasinghe and W-M. Shen, "Surprise-Based Learning for Developmental Robotics" ECSIS Symposium on Learning and Adaptive Behavior for Robotic Systems, LAB-RS 08, pp. 65-70, Aug. 2008.

N. Ranasinghe, Learning to Detect and Adapt to Unpredicted Changes, Doctoral Dissertation, University of Southern California, Aug. 2012, pp. 1-163.

Shen W.-M., Learning from the Environment Based on Actions and Percepts, Ph.D. dissertation, Dept. Computer Science, Carnegie Mellon University, Pittsburgh, PA, 1989, pp. 153-158.

Wei-Min Shen, Complementary Discrimination Learning with Decision Lists, AAAI-92 Proceedings, pp. 153-158, 1992.

* cited by examiner

METHOD AND APPARATUS FOR BIOLOGICALLY INSPIRED AUTONOMOUS INFRASTRUCTURE MONITORING

CLAIM OF PRIORITY UNDER 35 U.S.C. §119

This Application for Patent claims priority to U.S. Provisional Application No. 62/000,398, titled "Method and Apparatus for Biologically Inspired Autonomous Infrastructure Monitoring," filed on May 19, 2014; and U.S. Provisional Application No. 62/000,450, titled "Method and Apparatus for Pilotless Flying Control of Multiple Autonomous Mobile Vehicles Based on Dynamic Situational Awareness Data," filed on May 19, 2014, the entire contents of both of which are incorporated by reference herein.

GOVERNMENT LICENSE RIGHTS

This invention was made with government support under FA8750-12-C-0231 awarded by the Air Force Research Laboratory. The government has certain rights in the invention.

BACKGROUND

Autonomous mobile nodes such as unmanned airborne nodes (UANs) or unmanned aerial vehicles (UAVs) are often useful in various military and civilian applications. Maintaining constant and reliable communication between mobile entities, distributed or located across a large geographical area has been, however, a critical task for many commercial applications as well as military applications. For example, when teams of people are deployed in hostile or sensor deprived environments, maintaining radio contact with a command station or site would increase efficiency of coordinating the deployment and accomplishing mission objectives, yet maintaining communications should not interfere with the primary tasks of these entities.

Conventionally, most unmanned airborne nodes including unmanned aerial vehicles (UAVs), are operated remotely by a single operator. As such, forming a mobile communication network with multiple remotely controlled unmanned aerial vehicles can be prohibitively costly. Also, it is very inefficient because many operators are needed to remotely control the deployed unmanned airborne nodes, while coordinating with others to monitor the deployed communications network. Furthermore, there is no effective mechanism to deal with airborne node faults or failures in hardware or software when they are in flight. Such faults or failures may result an action or behavior becoming anomalous, meaning that it diverged from its normal or expected outcome.

Due to all of the above, there is a need for improved methods and systems for detecting anomalies and providing decision support to a human operator of one or unmanned airborne nodes, identifying possible causes of the detected anomalies, and recommending corrective measure.

SUMMARY

The following presents a simplified summary of one or more aspects in order to provide a basic understanding of this invention. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure relate generally to autonomous monitoring of a mobile ad-hoc wireless communication network. In particular, the present technology disclosed herein detects anomalous behavior during the deployment and maintenance of a wireless communication network formed autonomously by autonomous mobile nodes such as unmanned airborne nodes (UANs) or unmanned aerial vehicles (UAVs). An autonomous mobile node may experience anomalous or unexpected behavior in the presence of hardware/software faults/failures, or external influence (e.g. natural weather phenomena, enemy threats). The present technology disclosed herein autonomously detects, reasons with (e.g. differentiates an anomaly from natural interference), and alerts a human operator of anomalies at runtime via the formed communication network.

In one aspect, the present disclosure provides a method of detecting an anomaly in actions of an autonomous mobile node. Data including measurement data from one or more sensors of the autonomous mobile node are received and analyzed. Based on the measurement data from the one or more sensors onboard the autonomous mobile node, a prediction model about an action of the autonomous mobile node is determined. An anomaly is detected in the action of the autonomous mobile node, based at least in part on the determined prediction model.

In an aspect, a prediction model about an action of the autonomous mobile node can be determined as follows. Information about the action of the autonomous mobile node is learned based at least on the received measurement data, where the action of the autonomous mobile node is in connection with one of roles of the autonomous mobile node in a formation of a wireless communication network with other autonomous mobile nodes. The learned information may be stored as a prediction rule for the action of the autonomous mobile node for later use.

Another aspect of the present disclosure provides an apparatus including a memory and at least one processor coupled to the memory and configured to perform various operations. The at least one processor is configured to determine a prediction model of an action of the autonomous mobile node, based on measurement data from one or more sensors onboard the autonomous mobile node, and based on the determined prediction model, detect an anomaly in the action of the autonomous mobile node.

Another aspect of the present disclosure provides a non-transitory computer readable medium. The non-transitory computer readable medium includes instructions or code for detecting an anomaly in behavior of an autonomous mobile node. The instructions or code include code for causing a computer of the autonomous mobile node to receive measurement data from one or more sensors of the autonomous mobile node, and for causing the computer to, detect an anomaly in the action of the autonomous mobile node, based on the determined prediction model.

Alternatively, the measurement data may be received from other autonomous mobile nodes, and a prediction model about the action of the autonomous mobile node may be learned based on the received measurement data. Further, the prediction model may be comprised of one or more prediction rules. Each prediction rule may forecast the expected outcome of executing an action in terms of changes in the received measurement data.

These and other aspects of the invention will become more fully understood upon a review of the detailed description, which follows.

BRIEF DESCRIPTION OF THE DRAWINGS

The drawing figures depict one or more implementations in accordance with the present teachings, by way of example only, not by way of limitation. In the figures, like reference numerals refer to the same or similar elements.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present technology disclosed herein may also be known as "Biologically Inspired Autonomous Infrastructure Monitoring (BioAIM)" system and techniques ("BioAIM methodology") for detecting an anomaly in behavior of an autonomous mobile node or a group of autonomous mobile nodes. Further, the present technology, BioAIM methodology, has been developed for "Biologically inspired Artificially Intelligent Reconfiguration (BioAIR)" system and techniques ("BioAIR methodology"), which are developed to coordinate and control autonomous mobile nodes such as unmanned aerial vehicles (UAVs) deployed in the air in order to autonomously form and maintain dynamic communication networks. Thus, it is noted and will be apparent to one skilled in the relevant art that a BioAIR system is one of many other autonomous systems to which the present technology, BioAIM methodology, may be used in detecting and alerting anomaly in behaviors of an autonomous mobile node or an autonomous system. That is, the BioAIM methodology may be used for and in conjunction with, many other autonomous systems and methodologies including the BioAIR methodology.

As such, the present disclosure provides below detailed descriptions of the BioAIR methodology, as one of many other possible autonomous systems and methodologies, mostly in reference to FIGS. 1-14, in order to give a more comprehensive understanding and appreciation of the present technology.

Figure 1:
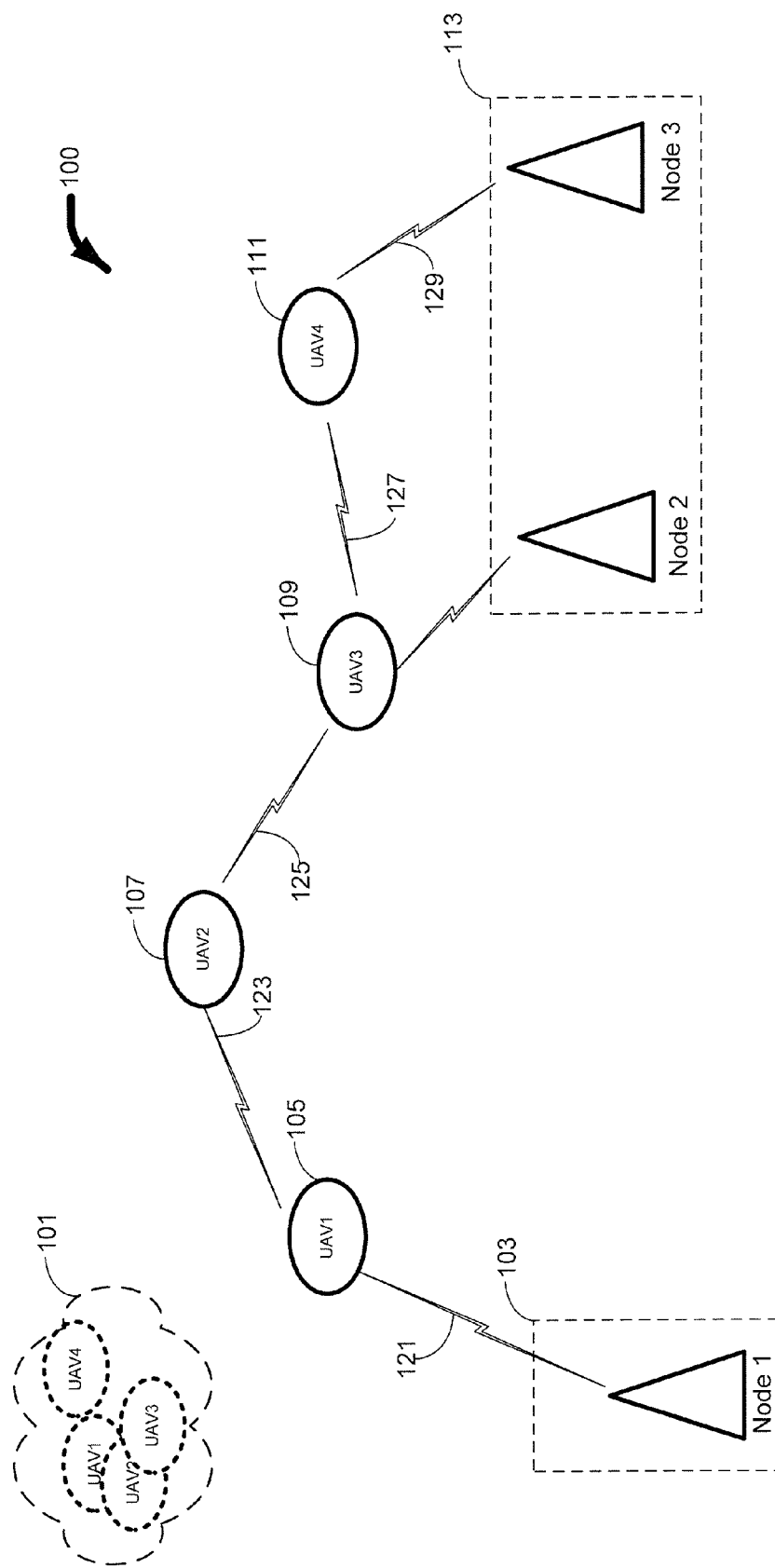
FIG. 1 is a conceptual diagram illustrating a wireless communications network in accordance with certain aspects of the BioAIR methodology.
Figure 10A:
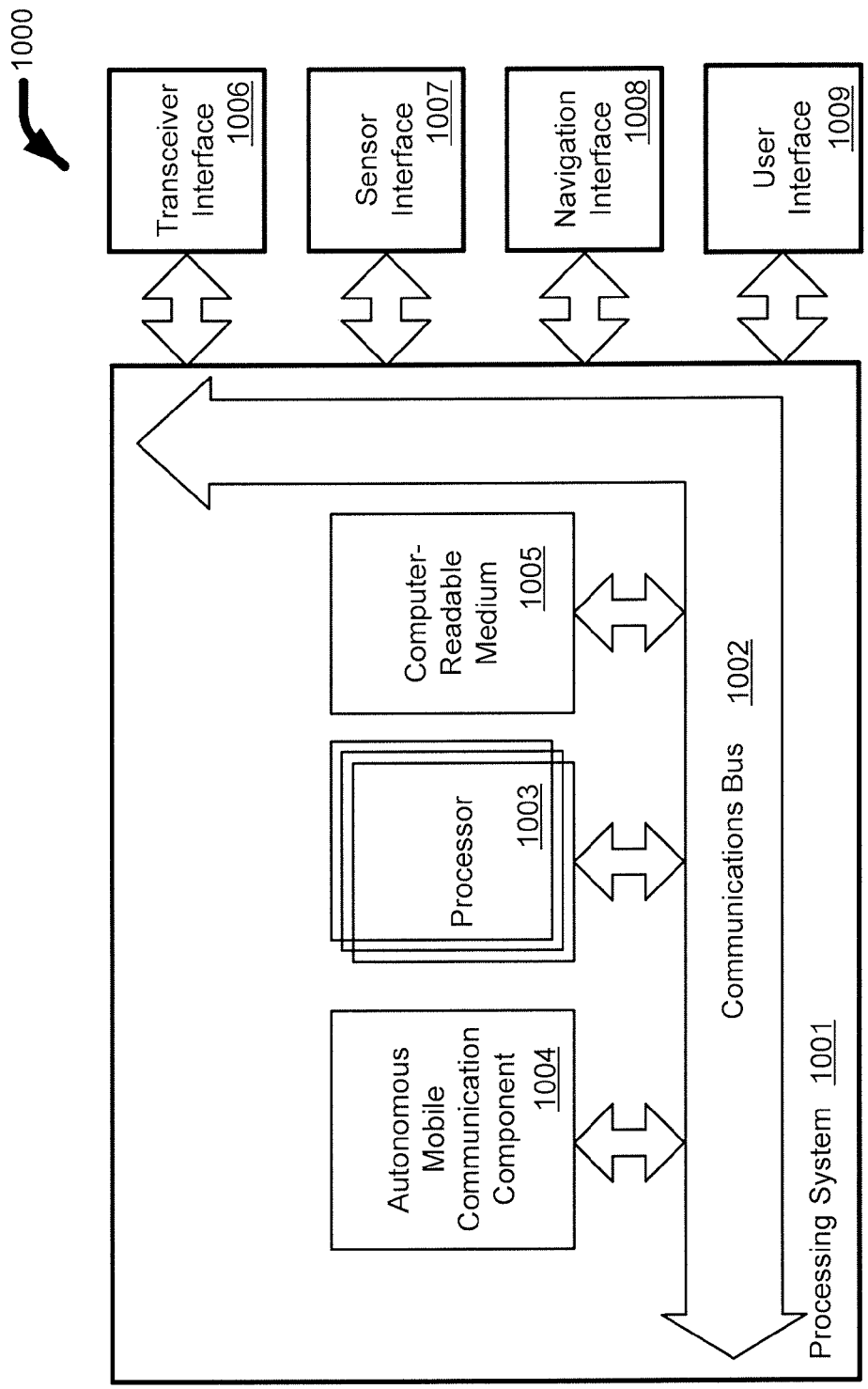
FIGS. 10A and 10B, and 10C are functional block diagrams and a user interface conceptually illustrating an apparatus in accordance with certain aspects of the BioAIR methodology.

FIG. 1 is a conceptual diagram illustrating a communications network in accordance with certain aspects of BioAIR methodology. In an aspect, the BioAIR methodology provides a distributed solution which coordinates efforts of one or more autonomous mobile nodes, such as various types of unmanned aerial vehicles, to achieve a robust wireless communication network between designated sites. In essence, the BioAIR methodology described herein enables collaborative communication among the one o more autonomous mobile nodes. As illustrated in FIG. 1, a communication network 100 includes one or more origin nodes 103 (e.g., Node 1), one or more autonomous mobile nodes 105, 107, 109, and 111 (e.g., UAV1, UAV2, UAV3, and UAV4) and one or more destination nodes 113 (e.g., Node 2, Node 3). In the example, the origin nodes 103 or destination nodes 113 may be mobile nodes or stationary nodes. Further, the one or more mobile nodes may include one or more unmanned aerial vehicles (UAVs) such as UAV1, UAV2, UAV3, UAV4, etc. Also, the one or more mobile nodes may include a component, such as an artificial intelligence program (which is not shown) such as, including but not limited to, an autonomous airborne communication component for establishing and maintaining wireless communications networks. That is, as described herein, each unmanned airborne node (interchangeably used herein as "autonomous mobile node" or "autonomous mobile apparatus") may include one or more processing systems on board, such as the processing system 1001 (as shown in FIG. 10A) including an autonomous airborne communication component 1004 for implementing various aspects of the BioAIR methodology.

In another aspect, each autonomous mobile node may have unique identification (ID) and/or Internet Protocol (IP) address assigned. The unique IDs and/or IP addresses may be assigned before deployment for a mission. In addition, or alternatively, the unique ID or IP address for each autonomous mobile node can be dynamically assigned to the autonomous mobile node over a wireless communications link by a node on the ground (e.g., Node 1) once the autonomous mobile node is deployed in the air and comes in contact with the node on the ground.

Alternatively, a plurality of autonomous mobile nodes may be deployed on the ground as well as in the air, and a designated autonomous mobile node may take a role of a server in a server-client network environment and dynamically assign the unique IDs and/or IP addresses to the deployed plurality of autonomous mobile nodes on the ground as well as in the air. In another aspect, each of the autonomous mobile nodes may communicate with other autonomous mobile nodes deployed in the air to determine a size of a wireless communication network for performing the mission.

As shown in the example in FIG. 1, a communication network 100 may be established between two nodes—an origin node (or site) 103, such as Node 1, and a destination node (or site) 113, such as Node 2 and/or Node 3, by forming a chain of communication links which comprises one or more wireless communication links 121, 123, 125, 127, and 129. In other words, in the example, a communication tentacle (or a tentacle) may be formed between the origin node 103 and the destination node 113. In the present disclosure, the word "tentacle" is used herein to mean a chain of communication links, or a chain of autonomous mobile nodes establishing a communication link among the autonomous mobile nodes, or a chain of multiple wireless communication links established by one or more autonomous mobile nodes. Thus, a tentacle as used herein may include one or more wireless communication links originating from a first node on the ground, e.g., Node 1. Further, a complete communication tentacle between the origin node 103 and the destination node 113 may refer to a chain of nodes including, for example, Node 1, UAV1, UAV2, UAV3, UAV4, Node 2 and/or Node 3, as shown in FIG. 1.

As noted above, in FIG. 1, Node 1, Node 2, and Node 3 may be ground stations or mobile nodes. In other words, Node 1, Node 2, and Node 3 can be either stationary nodes or moving nodes. Further, Node 1 may be a radio signal transmission and/or reception device or station. Also, Node 2 or Node 3 may be a radio signal transmission and/or reception device or station. Alternatively, in an aspect of the present disclosure, Node 1, Node 2 or Node 3 may include a destination, such as a group of people, devices, vehicles, etc.

In an aspect, the autonomous mobile nodes 105, 107, 109, and 111 may be launched or deployed from one or more nearby locations towards the origin node 103, such as Node 1. Also, the autonomous mobile nodes may be launched from anywhere at varying time intervals with some a priori knowledge about the origin node 103 and the destination node 113, such as geographical location information of the origin node 103 and the destination node 113. Alternatively, when multiple origin nodes are available, an operator of the communication network 100 may choose which one to assign for each autonomous mobile node prior to launch. Also, the autonomous mobile nodes 105, 107, 109, and 111 can be launched in any order. Further, in an aspect, the origin node 103 may be a traffic site (e.g., an area with a radio transmitter which can communicate with one or more autonomous mobile nodes) from which a tentacle can originate. The destination node 113 may also be a traffic site (e.g., an area with a radio transmitter which can communicate with one or more autonomous mobile nodes) which the tentacle can grow to reach such that a wireless communication network between the origin node 103 and the destination node 113 can be established.

In an aspect, the autonomous mobile nodes 105, 107, 109, and 111 can be programmed with certain data, such as a mission profile, before being deployed in the air. A typical mission profile may include location information of the origin node 103 and/or destination node 113, radio capabilities of the autonomous mobile nodes 105, 107, 109, and 111, and certain information on priority traffic nodes that need preferential treatment in various situations. The location information of the origin 103 or destination nodes 113 may include information on Global Positioning System (GPS) coordinates of the origin node 103 and the destination node 113. In addition or alternatively, the location information of the origin node 103 and the destination node 113 may be wirelessly transmitted to the autonomous mobile nodes 105, 107, 109, and 111 from a deployment site. The radio capabilities of the autonomous mobile nodes 105, 107, 109, and 111 may include wireless communication protocols, communication ranges, a number of wireless communication channels, a type of antenna (e.g., omni-directional vs. multi-directional antenna), etc.

In the example described herein, each autonomous mobile node makes a decision to move (or navigate) to a new location in the air or hold its position based on its internal role in the communication network 100 (e.g., Free, Orphan, Tip, Backbone, Extra, etc.), roles of adjacent autonomous mobile nodes in the communication network 100 (e.g., Free, Orphan, Tip, Backbone, Extra, etc.), signal strength, or quality of signals, such as radio frequency signals, received from its adjacent autonomous mobile nodes, or real-time data collected from onboard sensors of the autonomous mobile node. Further, each autonomous mobile node may take on a different role in the communication network 100 during or after a formation of a tentacle between the origin node 103 and the destination node 113. An example of role transitions of an autonomous mobile node is described below in reference to FIG. 3.

Referring back to FIG. 1, a group 101 of autonomous mobile nodes, such as UAV 1, UAV 2, UAV 3, and UAV 4 are deployed in the air from a location towards the origin node 103. For example, assume that the UAV 1 is first deployed among the group of autonomous mobile nodes. The UAV 1 autonomously moves and first comes in contact with the origin node 103, such as Node 1, and searches for a tentacle associated with the origin node 103. If there is no tentacle detected, then the UAV 1 creates a tentacle between the UAV 1 and Node 1, e.g., establishes a wireless communication link 121 (a tentacle) between the UAV 1 and Node 1. Once the UAV 2, UAV 3, and UAV 4 are deployed in the air, in accordance with certain aspects of the present disclosure, the UAV 2, UAV 3, and UAV 4 may autonomously fly towards Node 1 or Node 2. Each of the UAV 2, UAV 3, and UAV 4 searches and detects the tentacle associated with the origin node 103, and operates to grow or extend the tentacle towards the destination node 113, such as Node 2 or Node 3.

In one implementation, each autonomous mobile node may have a predefined wireless communication range (e.g., a short range, mid-range, or long range) and autonomously navigates to establish a wireless communication link with an origin node or another autonomous mobile node deployed and detected to be within its wireless communication range or connectivity range. Thus, the one or more autonomous mobile nodes may be used to grow the tentacle to cover a large distance from the origin node 103 to the destination node 113. For example, if the origin node 103 and the destination node 113 are close in proximity to each other, then one autonomous mobile node deployed in the air may be needed to establish a wireless communication network between the origin node 103 and the destination node 113. Otherwise, the two or more autonomous mobile nodes deployed in the air may be needed to form and grow the tentacle to cover a long distance apart between the origin node 103 and the destination node 113.

Further, after the communication network 100 (or the final tentacle) between the origin node 103 and the destination node 113 has been completed, any extra autonomous mobile node (not shown) may autonomously position itself to enhance the completed final tentacle 100 or grow a new tentacle to a new destination node.

Figure 2:
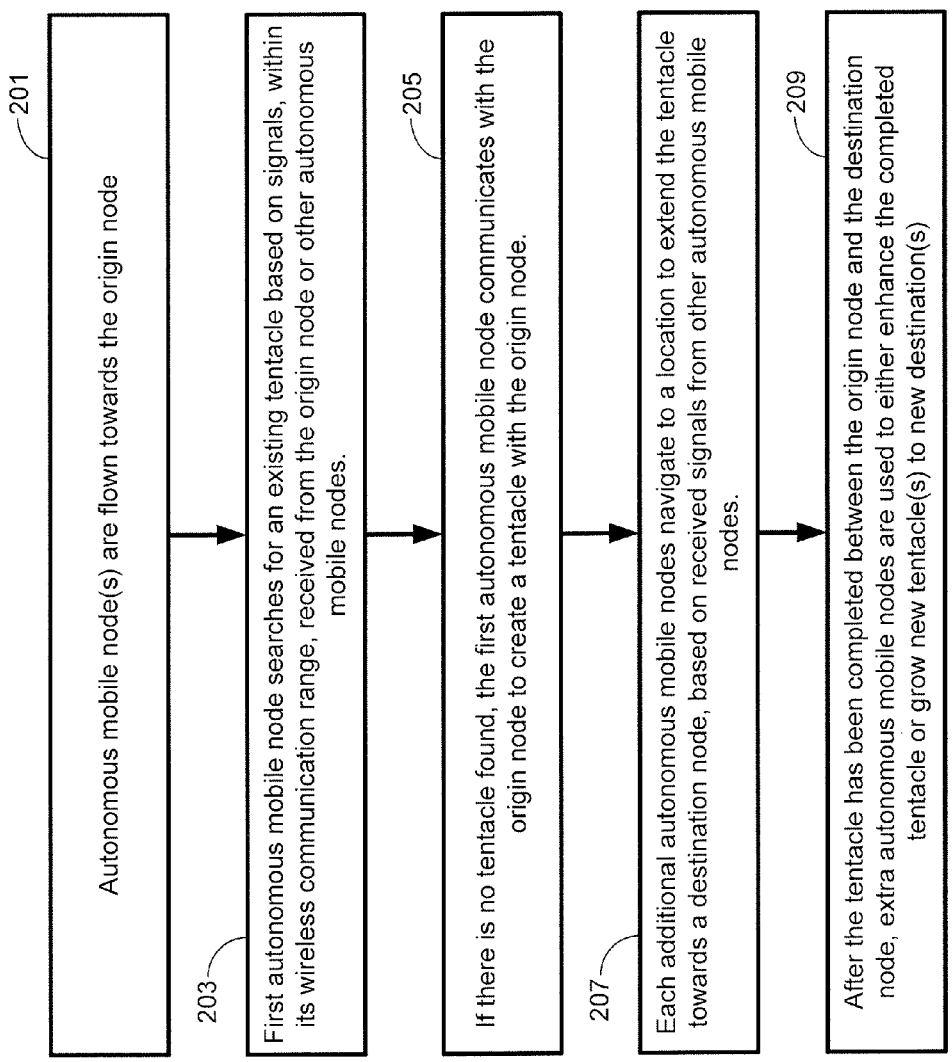
FIG. 2 is an example of a flowchart for autonomously establishing a wireless communication network in accordance with certain aspects of the BioAIR methodology.

FIG. 2 illustrates an example flowchart for establishing a wireless communication network or a tentacle originating from an origin node in the BioAIR methodology. Initially, at 201, a group of autonomous mobile nodes (e.g., a group of autonomous mobile nodes 101 in FIG. 1) are deployed in the air, with each autonomous mobile node programmed with certain location information (e.g., GPS coordinates), such as those of the origin node and/or the destination node.

At 203, a first autonomous mobile node may detect the origin node, when the first autonomous mobile node comes in contact with the origin node within its wireless communications range. Upon the detection of the origin node, the first autonomous mobile node may search for one or more existing tentacles associated with the origin node. The detection of the one or more existing tentacles may be done by communicating with the origin node or based on signals transmitted from the origin node or from other autonomous mobile nodes. In one implementation, the signals may be broadcast messages from the origin node or other autonomous mobile nodes. Each broadcast message may contain location information (e.g., GPS coordinates) of a broadcasting node, its role in a formation of a communication network or tentacle (e.g., Origin, Orphan, Free, Tip, Extra, Backbone, etc.). If the broadcasting node is part of a tentacle, the broadcast message may include information on the tentacle, such as a tentacle identifier and a state of the tentacle. As such, when the broadcast message does not include any information on the tentacle identifier and/or the state of the tentacle, then a receiving node may determine whether a tentacle is currently being created.

At 205, if no tentacle has been found or detected, the first autonomous mobile node becomes the first node to form an initial tentacle with the origin node. The first autonomous mobile node communicates with the origin node to create the initial tentacle with the origin node.

At 207, after the initial tentacle has been created (e.g., a wireless communication link has been established between the origin node and the first autonomous mobile node), each of remaining autonomous mobile nodes in the group autonomously navigate to a location towards a destination node, extending the initial tentacle towards the destination node by each adding an additional wireless communication link to the extended tentacle at an edge of a wireless communication range of its adjacent autonomous mobile node, which is an end of the previously extended tentacle.

In one implementation of the BioAIR methodology, a particular autonomous mobile node may move along the extended tentacle towards a location determined for the particular autonomous mobile node, based on information (e.g., signal quality) received from other autonomous mobile nodes in the group. When the particular autonomous mobile node arrives at the location, the particular autonomous mobile node may extend the previously extended tentacle by establishing and adding a wireless communication link between the particular autonomous mobile node and another autonomous mobile node which is a tip of the previously extended tentacle. The particular autonomous mobile node then becomes a new tip of the newly extended tentacle. In this way, with a sufficient number of autonomous mobile nodes used, the tentacle originating from the origin node can autonomously grow to reach the destination node over a distance (e.g., the tip of the tentacle and the destination node are within a wireless communication range of each other) by iteratively adding an additional communication link to a tip of the previously extended tentacle, as shown in FIG. 1.

Further, in another aspect of the BioAIR methodology, when there are multiple origin nodes and multiple destination nodes, one or more wireless communication networks (or tentacles) can be created from the multiple origin nodes to the multiple destination nodes through collaboration of autonomous mobile nodes as described above.

At 209, after the tentacle has been completed between the origin node and the destination node, any extra autonomous mobile nodes deployed in the air, which are not used to form the tentacle may be used to either enhance the completed tentacle or grow new tentacle(s) to new destination(s).

As noted above, a tentacle may be initially formed by an autonomous mobile node that first comes in wireless contact with the origin node, and thereafter the tentacle may grow in a manner similar to a biological growth by means of using additional autonomous mobile nodes deployed in the air. During the process of forming and growing the tentacle, each autonomous mobile node can take different roles or modes, as illustrated in FIG. 3.

Figure 3:
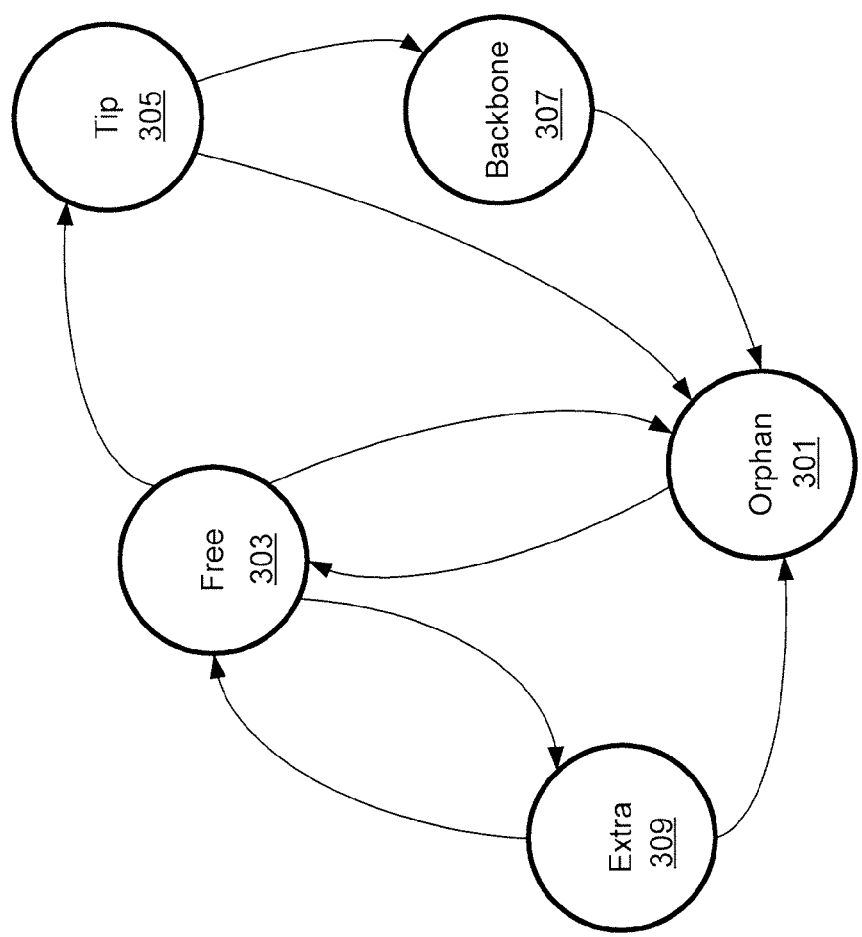
FIG. 3 is an example of a diagram illustrating transitions of different roles of a node in accordance with certain aspects of the BioAIR methodology.

FIG. 3 illustrates an example diagram of role transitions illustrating different roles which each autonomous mobile node can assume in accordance with certain aspects of the present disclosure. As shown in FIG. 3, each autonomous mobile node may take one of the following roles or modes: "Orphan" 301 (e.g., an Orphan node), "Free" 303 (e.g., a Free node), "Tip" 305 (a Tip node), "Backbone" 307 (a Backbone node), or "Extra" 309 (an Extra node).

An Orphan node is a node that is outside of a communication range of any other autonomous mobile nodes. That is, the Orphan node may be disconnected from a tentacle or an origin node. A Free node is a node that can communicate with a tentacle or one or more autonomous mobile nodes forming the tentacle, but is not a part of the tentacle. A Free node is attracted by a destination node (e.g., attracted by a virtual destination field exerted by the destination node) and its anchor or Tip node, but it is repelled by all other nodes. A Tip node is a node that is currently at the tip of a tentacle and has wireless connectivity with an adjacent node located towards the origin node. A Backbone node is a node participating in forming a tentacle (or a wireless communication network between the origin node and the destination node), but not the Tip node. The Backbone node has wireless connectivity with either two Backbone nodes (e.g., UAV 2 in FIG. 1), with a Backbone node and the origin node (e.g., UAV 1 in FIG. 1), or with a Backbone node and the destination node (e.g., UAV 4 in FIG. 1), within its wireless communications range. Also, between two adjacent nodes (or sometimes referred to as tentacle nodes) there may be a parent-child relation, which is ordered from the origin node towards the destination node. That is, a node close to the origin node becomes a parent of another node (e.g., a child) in a tentacle formation. In the example, a Backbone node is attracted by its parent and child node, but it is repelled by all other nodes. An Extra node is a node that has reached the destination node, but is not required to extend the tentacle or form a part of the wireless communication network between the origin node and the destination node. The Extra node is free to move around or patrol around the tentacle formed between the origin node and the destination node.

As illustrated in FIG. 3, an autonomous mobile node may go through various role transitions during a formation of a tentacle. By way of example, initially, a new tentacle is created when an origin node changes its role to become a Tip node. One or more autonomous mobile nodes flown towards the origin node to form the tentacle are initially Orphan nodes. That is, in the example, at an initial deployment stage, all of the autonomous mobile nodes are disconnected from a tentacle or the origin node, and thus they are the Orphan nodes (e.g., in Orphan 301). An Orphan node may autonomously navigate towards the origin node, based on the location information of the origin node. Here, the location information, (e.g., GPS coordinates) of the origin node and/or of the destination node may be pre-programmed in memory of the Orphan node. Alternatively, the location information of the origin node may be wirelessly transmitted to the Orphan node while being deployed in the air.

When the Orphan node detects in its wireless communication range the origin node or a tentacle originating from the origin node but is not a part of the tentacle yet, the Orphan node becomes a Free node (e.g., in Free 303). By way of example, when the Free node detects a tentacle or a Tip node, which is a node at the end of the tentacle, the Free node establishes an anchor relation to the Tip node. The Free node is configured to move freely or along the tentacle to an equilibrium location based on a field from the Tip node and the destination node (which is described in detail below). At the equilibrium location, the Free node becomes a new Tip of the tentacle, thereby extending the tentacle by adding an additional wireless communication link (or range) of the autonomous mobile node. That is, if the autonomous mobile node detects one or more tentacles originating from the origin node, which are established by other autonomous mobile nodes, then the autonomous mobile node navigates along the tentacle and becomes a new Tip node at the end of the tentacle, extending the tentacle towards the destination node.

When the new Tip node establishes wireless connectivity with the previous Tip node, the previous Tip node becomes a Backbone node (e.g., in Backbone 307) of the tentacle and maintains wireless communications with an adjacent Backbone node and the new Tip node.

In this way, as an additional autonomous mobile node (e.g., a Free node) becomes a new Tip node one after another, the tentacle can be extended and eventually be extended from the origin node to reach the destination node because the tentacle is designed to extend in the direction of the destination node. Also, when the newly added node at the end of the tentacle becomes a Tip node and its adjacent node becomes a Backbone node, the newly added node becomes a child of the adjacent node in the tentacle formed and the adjacent node becomes a parent of the newly added node.

By repeating the process described above in an iterative manner, a wireless communication network originating from the origin node can be extended to reach the destination node, via using a number of autonomous mobile nodes. As noted above, the tentacle is thus "complete" between the origin node and the destination node only when the wireless communication network is established between the origin node and the destination node by means of one or more autonomous mobile nodes forming the tentacle.

In an aspect of the BioAIR methodology, after completing the tentacle with the destination node, the last autonomous mobile node added to the tentacle may send a message to its nearest neighboring autonomous mobile node to inform that the tentacle has now been completed and/or a wireless communication network between the origin node and the destination node has been established. The nearest neighboring autonomous mobile node receives and forwards the message to its other nearest neighboring autonomous mobile node in the tentacle. The message is then propagated throughout the tentacle and reaches the origin node after multiple relays or forwarding of the message via intermediate nodes ("a one-hop broadcast to nearest neighbor scheme").

Further, in the completed tentacle, all communication messages and data transfers from any node in the tentacle including the origin node and/or the destination node are performed using the one-hop broadcast to nearest neighbors scheme, e.g., by relaying or forwarding data from a sending node to its nearest neighboring node in the tentacle either towards the origin node or the destination node.

In an aspect of the BioAIR methodology, after the tentacle is completed between the origin node and the destination node, there can be some autonomous mobile nodes (e.g., Free nodes) which did not participate in forming the tentacle between the origin node and the destination node. Such Free nodes, which are deployed but are not needed to form the tentacle, become Extra nodes (e.g., in Extra 309). In another aspect, the Extra nodes may be used to reinforce the existing tentacle or build new tentacles, if desired. Alternatively, the Extra nodes may (i) stay around the destination node, (ii) fly back to the origin node along the completed tentacle, (iii) distribute along the completed tentacle to enhance the completed tentacle, or (iv) start to build a new tentacle for a new destination.

Alternatively, the Extra nodes may patrol back and forth along the completed tentacle between the origin node and the destination node to aid quick repair when damage to the wireless communication network is detected. In another aspect according to the BioAIR methodology, the Extra nodes may spread around the destination node to improve threat tolerance at or near the destination node. In another aspect of the BioAIR methodology, the Extra nodes may spread around the origin node to improve surveillance at the origin node. Still in another aspect, in a case of multiple origin nodes, a unique identification may be assigned to each completed tentacle between an origin node and a destination node.

Figure 4:
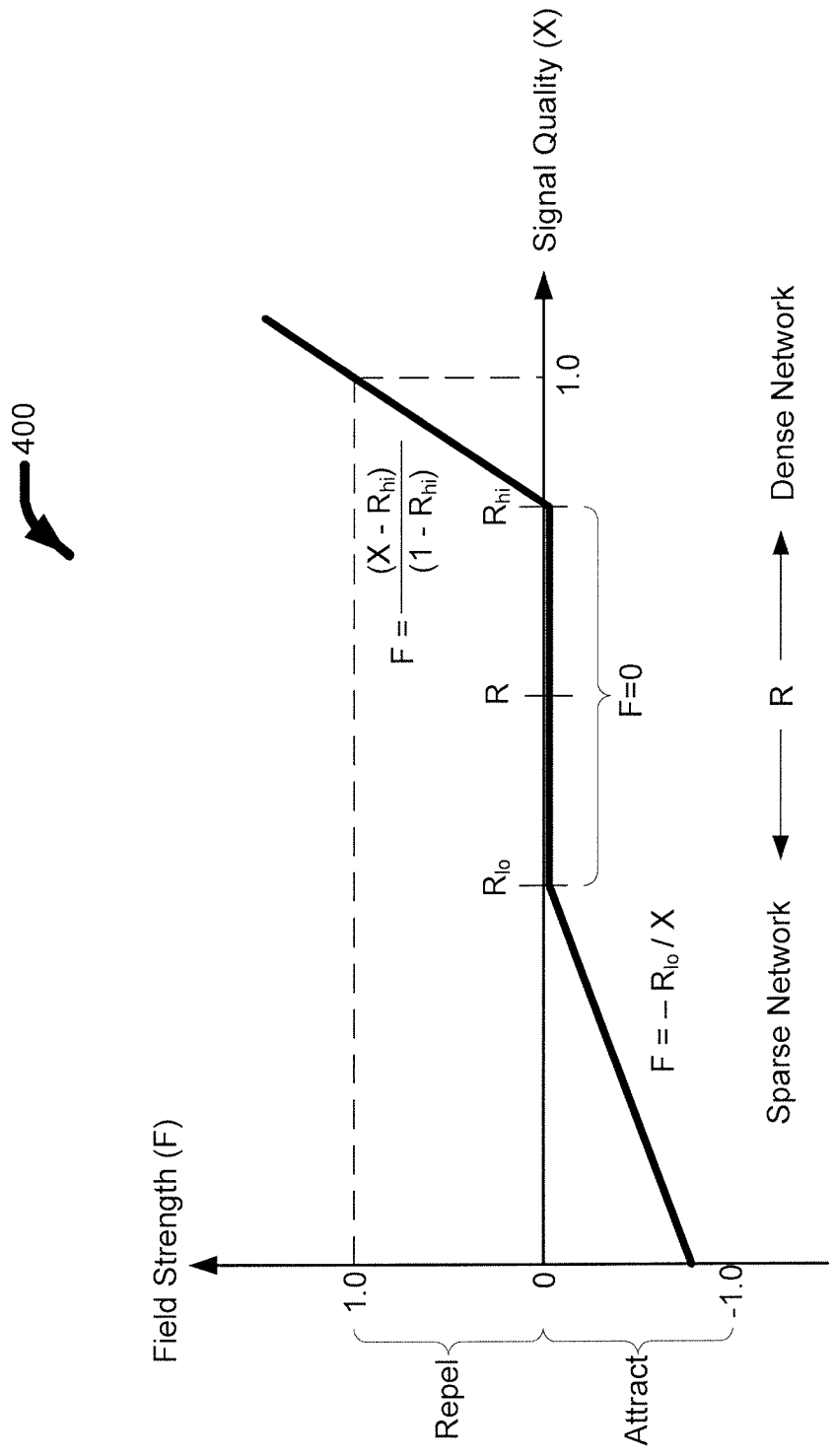
FIG. 4 is an example of a profile of field experienced by a node in accordance with certain aspects of the BioAIR methodology.

FIG. 4 provides a conceptual diagram in accordance with certain aspects of the present disclosure. In the example, navigating an autonomous mobile node along one or more tentacles or wireless communication links is based on a profile of fields experienced by each autonomous mobile node. In an aspect of the BioAIR methodology, the autonomous mobile node may hold its position at an edge of its communications range to a neighboring autonomous mobile node based on information on signals (e.g., signal strength, quality of signals, etc.) received from the neighboring autonomous mobile node. In one implementation, the signal strength or quality of signals may be converted into a vector with components, such as field strength and direction components, which correspond to the autonomous mobile node being attracted or repelled by the nearest neighboring autonomous mobile node. In an aspect of the BioAIR methodology, the quality of received signals may be determined based on a signal level or signal strength of a received radio frequency transmission. Signal strength is often measured and expressed in signal power (dBm or dBmW) received by an antenna of a deployed device, such as the autonomous mobile node; that is, in decibels (dB) above a reference level of one milliwatt (mW).

As shown in FIG. 4, a graph of signal quality (X) vs. field strength (F) is illustrated. Received signal quality (X) is converted into field strength (F) to determine whether attraction or repulsion is to be acted upon an autonomous mobile node. The graph shown in FIG. 4 illustrates such an example scheme, in which when the autonomous mobile nodes are spatially close to each other, they repel to prevent collisions, i.e., $X > R_{hi}$, where X represents received signal quality and $R_{hi}$ represents an upper limit of a reference signal quality value R. The graph further shows that when the autonomous mobile nodes are outside an acceptable range, they attract each other, i.e., $X < R_{lo}$, where X represents received signal quality and $R_{lo}$ represents a lower limit of the reference signal quality value R. Further, when the autonomous mobile nodes are completely out of a communication range, there is no signal or field.

Figure 5:
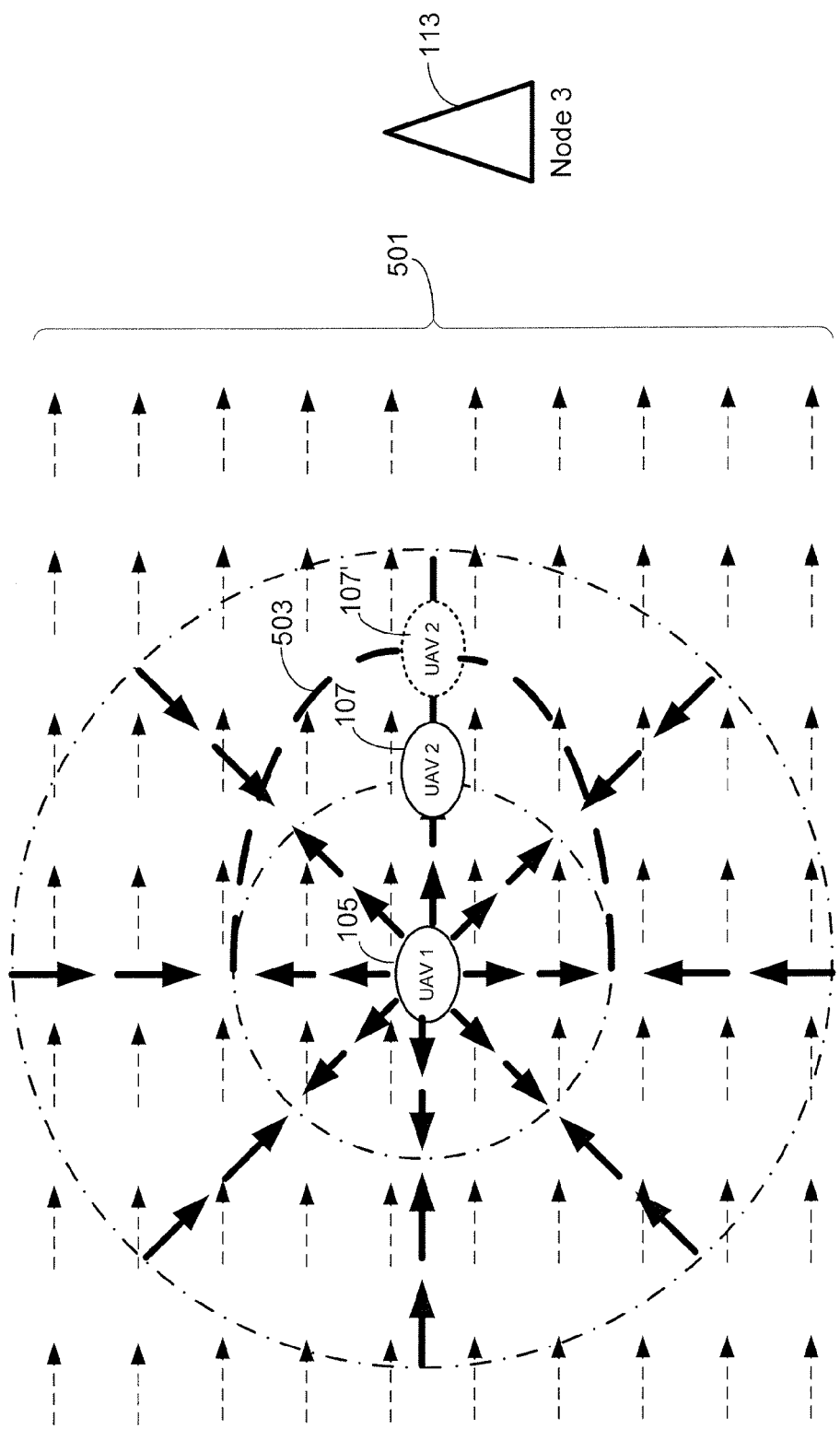
FIG. 5 is a conceptual diagram illustrating fields guiding a autonomous mobile node towards a (designated) destination node in accordance with certain aspects of the BioAIR methodology.

It is also noted that at the beginning of an initial deployment of autonomous mobile nodes, each autonomous mobile node may be provided with the location information of a destination node, such as Node 2 shown in FIG. 5, so as to compute a virtual attraction field 501 (see FIG. 5) towards a destination node 113, such as Node 2, even when the autonomous mobile node is outside of the communication range. Further, for illustration purposes, FIG. 5 shown only one destination node, such as Node 2, but there can be multiple destination nodes, such as Node 2 and Node 3, as shown in FIG. 1. In such a case of multiple destination nodes including Node 2 and Node 3, each autonomous mobile node may be provided with location information of the multiple destination nodes including Node 2 and Node 3, and a first virtual attraction field towards Node 2 may be computed first and then a second virtual attraction field towards Node 3 may be computed.

In an aspect of the BioAIR methodology, the field strength of the received signal quality of a radio frequency transmission may be calculated using the following expression (A):

If($X > R_{hi}$), Field_Strength=$(X - R_{hi})/(1 - R_{hi})$

Else If($X < R_{lo}$), Field_Strength=$-R_{lo}/X$

Else Field_Strength=0.

Also, velocity components (e.g., velocityX and velocityY) of field strength can be computed using the following expression (B):

velocityX=velocityX+Field_Strength*$(x_{self} - x_{other})$/sqrt$((x_{self} - x_{other})^2 + (y_{self} - y_{other})^2)$, and velocityY=velocityY+Field_Strength*$(y_{self} - y_{other})$/sqrt$((x_{self} - x_{other})^2 + (y_{self} - y_{other})^2)$, FIG. 5 illustrates a visualized diagram of example fields interacting between two adjacent autonomous mobile nodes 105 and 107 (e.g., UAV 1 and UAV 2) and a virtual attraction field 501 exerted by a destination node 113, such as Node 2. In one implementation of the BioAIR methodology, this virtual attraction field has a fixed magnitude of 1.0, and points in the direction of the destination node 113. Further, the virtual attraction field may be replaced by a field of the destination node 113 when the autonomous mobile node 107 is within a communication range with the destination node 113. In the example, based on the above expressions (A) and (B), the fields acting on the autonomous mobile node 107 are computed. The computed fields are summed together, resulting in an elliptical trajectory 503 for the autonomous mobile node 107. The elliptical trajectory 503 guides the autonomous mobile node 107 to an equilibrium point (e.g., the autonomous mobile node 107' at the equilibrium point) that exists closer to the destination node 113. In this way, the autonomous mobile node 107 autonomously navigates itself based on the fields (which may be based on received signal strengths) towards the destination node 113 within a wireless communication range of the autonomous mobile node 105 (e.g., while maintaining wireless communications with the autonomous mobile node 105).

Figure 6:
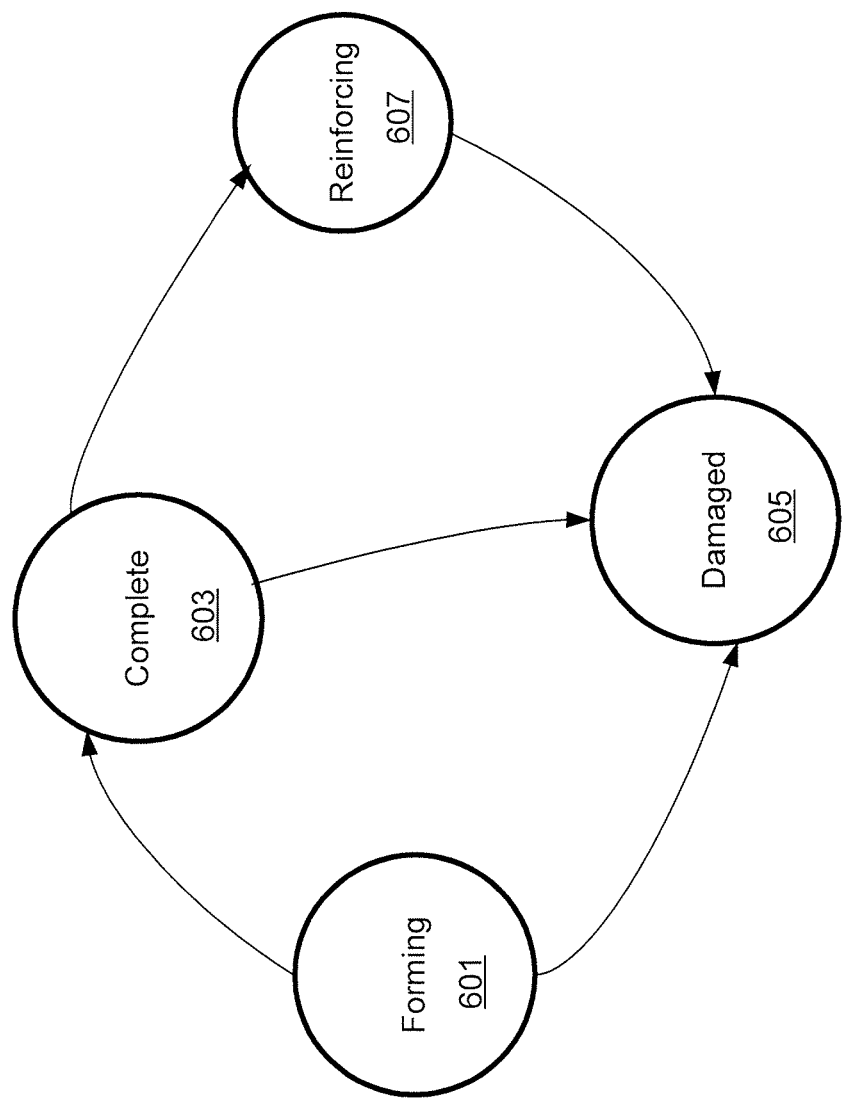
FIG. 6 is an example of a diagram illustrating state transitions for a wireless communication network in accordance with certain aspects of the BioAIR methodology.

Further, a tentacle may have its own state transitions. For example, FIG. 6 illustrates an example diagram for state transitions for a tentacle in accordance with certain aspects of the BioAIR methodology. That is, the tentacle originating from the origin node can be in different states depending upon its progress towards establishing wireless connectivity between the origin node and the destination node. In an aspect of the BioAIR methodology, the tentacle can be in one of the following states: Forming 601, Complete 603, Damaged 605, and Reinforcing 607.

In Forming 601 state of the tentacle, a new tentacle (or an initial wireless communication network) starts from an origin node or a destination node that has already been reached. Initially, there may not be any Tip node, but as soon as a first autonomous mobile node reaches its equilibrium point in its field, the first autonomous mobile node will become a Tip node. Also, the first autonomous mobile node may generate a unique identifier (ID) for the tentacle or the wireless communication network. For example, in one implementation, the unique identifier for the tentacle (the "tentacle ID") may be generated by merging a timestamp with the unique ID of the first autonomous mobile node. This allows a node to create or recreate a unique tentacle ID at different points in time. Use of unique tentacle IDs may facilitate construction of multiple tentacles, from a single origin node or to a single destination node without interfering with each other. Alternatively, with the unique tentacle IDs, multiple tentacles may be formed from a single origin node to multiple destination nodes, or from multiple origin nodes to a single destination node. When in contact with an incomplete tentacle, a node obtains its identifier (e.g., the tentacle ID) such that only signals from nodes containing the same tentacle ID may contribute to calculating the fields, thus removing interference from other tentacles.

Further, in the Forming 601 state of the tentacle (or a wireless communication network), the tentacle may include some Free nodes, Backbone nodes, and one Tip node. When the wireless communication network via one or more tentacles is established between the origin node and the destination node (e.g., the tentacle grows to reach the destination node), the tentacle or wireless communication network is in Complete 603 of the tentacle. Furthermore, when a Free node reaches within wireless communication ranges of a Tip node in the tentacle and the destination node, the Free node may complete the tentacle (or the wireless communication network), thereby establishing the wireless connectivity via the one or more autonomous mobile nodes between the origin node and the destination node over a distance. When the tentacle is complete (e.g., in Complete 603), all autonomous mobile nodes forming the tentacle will change their roles to become Backbone nodes, and no Tip node will exist in the tentacle or the network.

As soon as the tentacle has been completed from the origin node to the destination node, if no new destination nodes exist, then, as noted earlier, remaining Free nodes may become Extra nodes and anchor to the Backbone nodes of the tentacle for reinforcement purposes (e.g., in Reinforcing 607). In one implementation of the BioAIR methodology, each Backbone node may anchor one Extra node such that the one Extra node may receive signals from two or more neighboring Backbone nodes. This strategy ensures that a second tentacle may be formed given a sufficient number of mobile nodes at a safe distance away from the first tentacle, which means that if any damage occurs to the wireless communication network or the tentacle, the wireless communication network will reroute its traffic with minimal interruption.

In accordance with certain aspects of the BioAIR methodology, a Free node may be adjacent to two Backbone nodes, a Tip node and a Backbone node, or a Backbone node and the origin or destination node. If any Backbone node is determined to not meet these criteria, then the tentacle or the wireless communication network is deemed to be damaged (e.g., in Damaged 605). When the damage is detected by a node, the node changes its role to become a Tip node (from a Backbone node), and any anchored Extra nodes are released to perform the needed repair (e.g., replacing the damaged Backbone node in the tentacle or the wireless communication network).

In one implementation of the BioAIR methodology, when multiple origin nodes are available, an operator may choose which origin node to assign to each autonomous mobile node prior to its launch. In another implementation of the BioAIR methodology, the multiple origin nodes can be assigned dynamically based on a number of Extra nodes and damage detected in the wireless communication network. In the presence of multiple destinations, a tentacle to the first destination can be completed, and then another tentacle can be built from that first destination to the next, and so on. When two partially completed tentacles meet, a Free node will encounter two Tips and the methodology disclosed herein may merge these two tentacles into one. This process helps to repair damage at multiple locations simultaneously by forcing reinforcement nodes to arrive from the origin node and/or the destination node.

In accordance with certain aspects of the BioAIR methodology, each autonomous mobile node in the tentacle can autonomously detect damage to the tentacle and initiate a repair process.

Figure 7A:
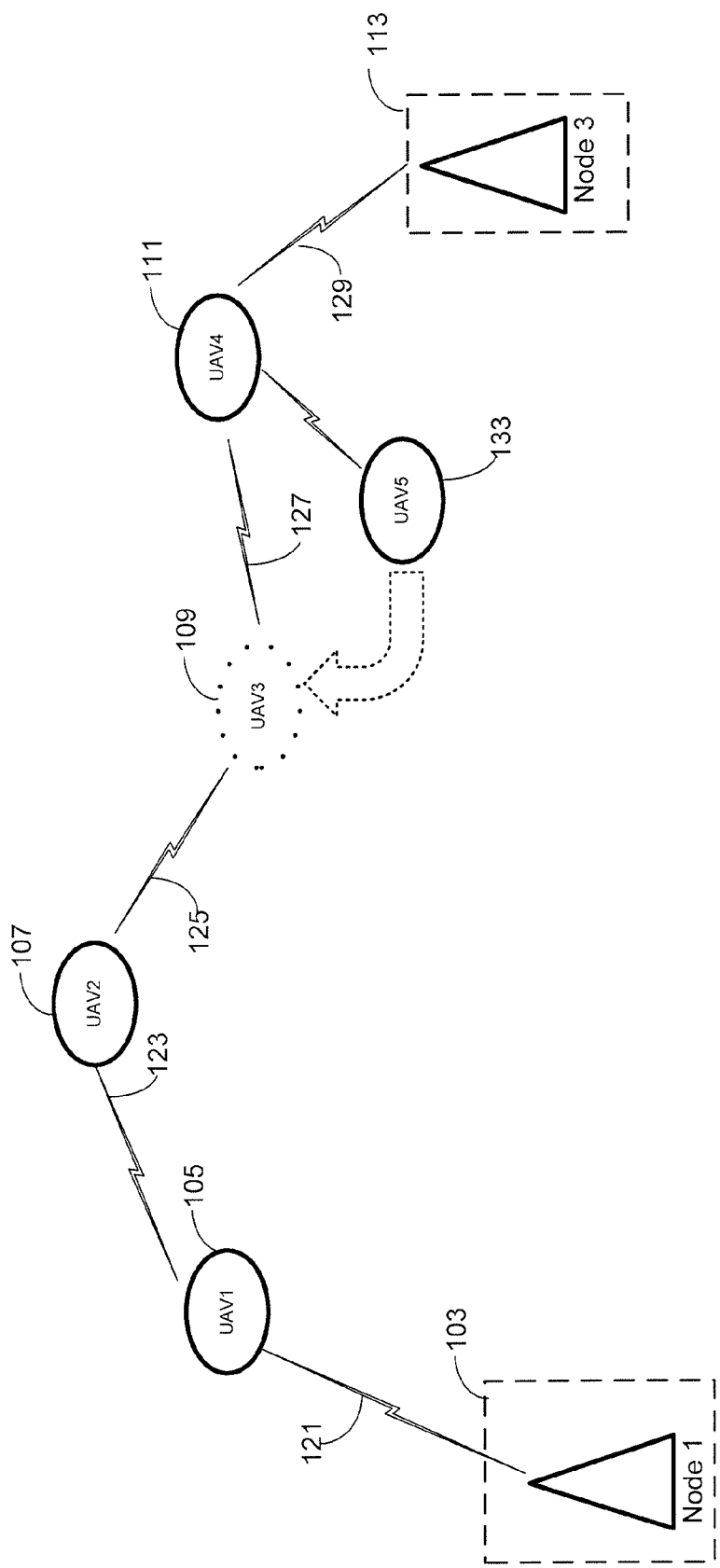
FIGS. 7A and 7B are an example diagram illustrating damage detection and repair of a wireless communication network in accordance with certain aspects of the BioAIR methodology.

By way of example, FIG. 7A provides another illustrative example for detecting and repairing damage to a tentacle in the BioAIR methodology. It is assumed in FIG. 7A that the autonomous mobile node 109 is damaged (e.g., due to a mechanical failure or a hostile environment) and in out of communications with other autonomous mobile nodes, such as UAV 2 and UAV 4. As a result, the tentacle or the once complete wireless communication network between the origin node 103 and the destination node 113 is broken. It is also assumed that an autonomous mobile node 133, such as UAV 5, is an Extra node anchored to the autonomous mobile node 111, such as UAV 4, which is in a communication range of the tentacle.

In an aspect of the BioAIR methodology, each autonomous mobile node is configured to check the status of its parent node and child node on a regular basis. In as aspect, one or more probing signals can be used to ensure the status of its parent and child nodes on regular basis. For example, at a predetermined time interval (e.g., 20 seconds) each autonomous mobile node may send a probe signal to its parent node and child node to check the status of the nodes. In one implementation, the probe signal may be a heartbeat signal sent by an autonomous mobile node to its neighboring autonomous mobile nodes (e.g., its parent and child nodes), and in response to the probe signal, the parent and child nodes each respond with a reply signal informing that the parent and child nodes are operational and are in communication with other nodes in the tentacle.

In another implementation of the BioAIR methodology, broadcast messages may be used to ensure the status of its parent and child nodes on a regular basis. For example, each autonomous mobile node may send a broadcast message to its parent and child nodes, informing that the autonomous mobile node is alive and operational. If the broadcast message is not received from either the parent node or the child node within a predefined time interval, such as 1 minute, then it may be assumed that either the parent node or the child node is damaged (e.g., hardware failure, software failure, etc.) and thus the tentacle is damaged. This process may also identify the location of damage to the tentacle, which is required for faster repair response.

In the example shown in FIG. 7A, by way of example, the autonomous mobile node 111 (or 107) expects a signal (e.g., a broadcast signal) from the autonomous mobile node 109 within a period of time (e.g., 1 minute), which may be a configurable parameter or a pre-set parameter that can be pre-programmed before launch or deployment. However, since the autonomous mobile node 109 is damaged (e.g., the autonomous mobile node 109 is down due to a mechanical failure), the autonomous mobile node 111 (or 107) fails to receive any signal and its timer expires. Upon expiration of the timer, the autonomous mobile node 111 (or 107) determines that the autonomous mobile node 109 is damaged or down. Further, the autonomous mobile node 111 (or 107) changes its role to Tip from Backbone and informs all other nodes (including adjacent neighboring nodes) to change their roles. For instance, an Extra node, such as the Extra node 133, will become a Free node, a Backbone node, such as a node 107, 105, or 111, will become a Tentacle node, and an Enhance node will become a Free node.

As a result, the Free node 133 autonomously moves to the location of the damaged node 109 and takes the place of the damaged node 109 in a tentacle formation. That is, the Free node 133 rebuilds the tentacle (e.g., complete the tentacle) by establishing wireless connectivity with both neighboring nodes, such as the autonomous mobile node 111 and the autonomous mobile node 107. The roles of the autonomous mobile nodes in the completed tentacle change to Backbone (including all Tentacle nodes becoming Backbone nodes) and any Free nodes associated with the tentacle become Extra nodes. As a result, the wireless communication network is re-established between the origin node 103 and the destination node 113, and damage to the wireless communication network is repaired autonomously by one or more of the autonomous mobile nodes deployed such as Extra nodes 133.

Figure 7B:
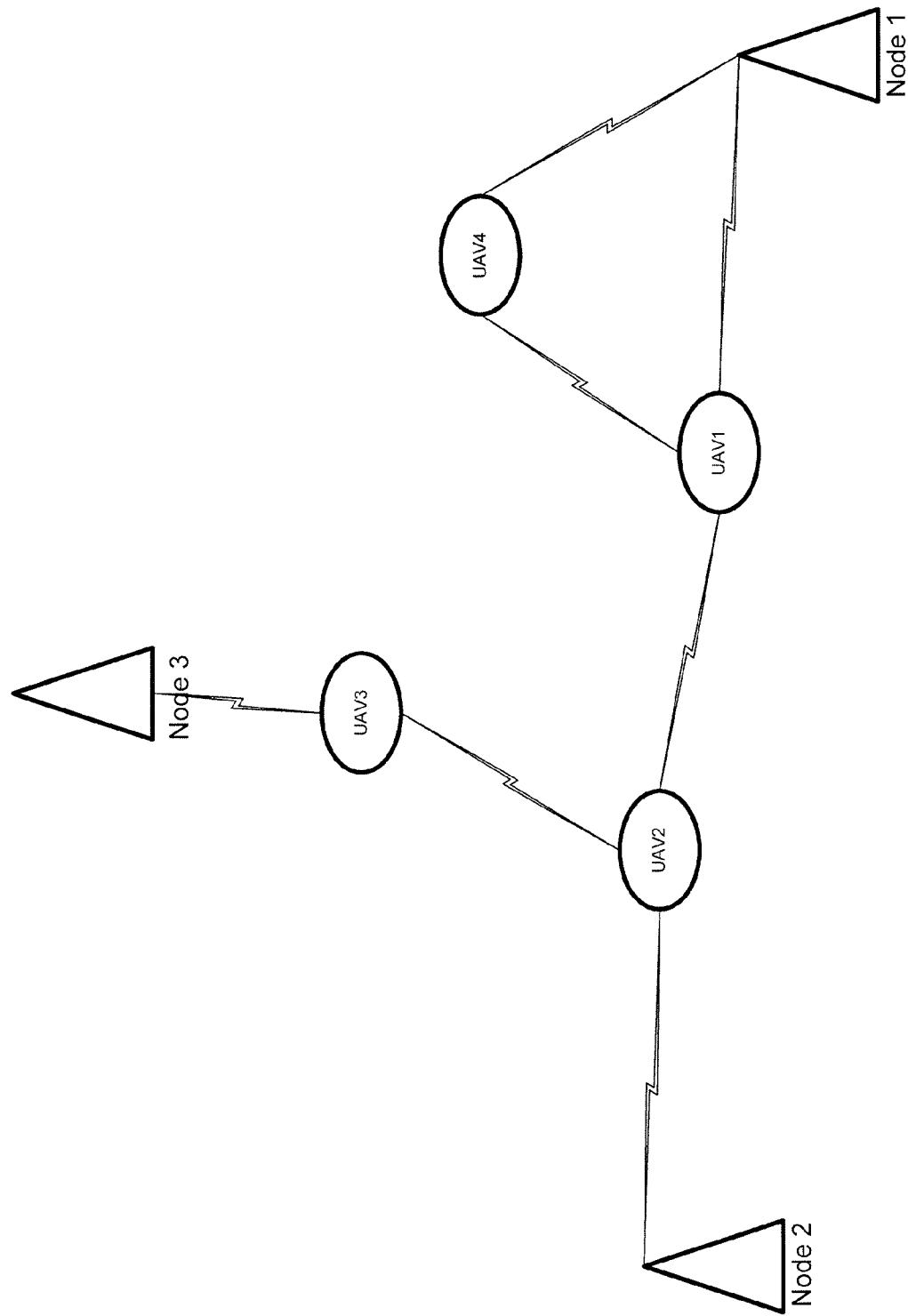

As noted above, when a tentacle is completed from an origin node to a destination node, all nodes in the tentacle become Backbone nodes, and all Free nodes become Extra nodes, which are associated with the tentacle. In accordance with certain aspects of the BioAIR methodology, as shown in FIG. 7B, an Extra node may be used to enhance the completed tentacle. The Extra node may be configured to travel from one Backbone node to next Backbone (e.g., patrol the tentacle). If the current Backbone node K (UAV 1 or UAV 2) does not have any enhancement thereof, then the Extra node may change its role to Enhance and establish an enhancement relation with the Backbone node K as shown in the example in FIG. 7B. Alternatively, the Extra node (e.g., UAV 4) may stay close to the Backbone node K (e.g., UAV 1) within a communication range of the Backbone node K. Also, in an aspect, the tentacle may be evenly enhanced at the end of the tentacle. Further, as noted, when the tentacle is enhanced, the remaining Extra (e.g., UAV 3 or UAV 4) nodes may continue to patrol along the tentacle. As a result, using the BioAIR methodology, a wireless communication network between an origin node and a destination node (or two nodes on the ground) may be autonomously built and maintained via one or more autonomous mobile nodes. Also, based on role changes of the one or more autonomous mobile nodes, any damage to the wireless communication network may be autonomously and efficiently detected and repaired. Further, critical portions of the wireless communication network or the tentacle may be autonomously enhanced by one or more autonomous mobile nodes associated with the tentacle.

Further, in an aspect of the BioAIR methodology, one or more computer systems in the one or more autonomous mobile nodes associated with the tentacle may be configured to perform various functionalities relating to establishing, maintaining, repairing, and enhancing a wireless communications network using the one or more autonomous mobile nodes.

Further, the BioAIR methodology thus facilitates collaborative sensing through one or more heterogeneous sensors attached to one or more nodes. In particular, a post-processed measurement from a sensor such as chemical, biological, optical, camera, radio, network, etc. can be transformed into field information including a field strength and added onto the velocity computation to alter a node's trajectory as described herein.

In accordance with certain aspects of the BioAIR methodology, the BioAIR methodology can be used to track movement of a second node on the ground (e.g., a friendly or hostile destination) for surveillance purposes and tactical missions using video or image sensor(s) on board. The virtual attraction field 501 shown in FIG. 5 may be replaced by a sensed field whose magnitude is proportionate to distance from the sensed object. Such information can be extracted from the image sensor(s) with separate object recognition software.

Figure 8:
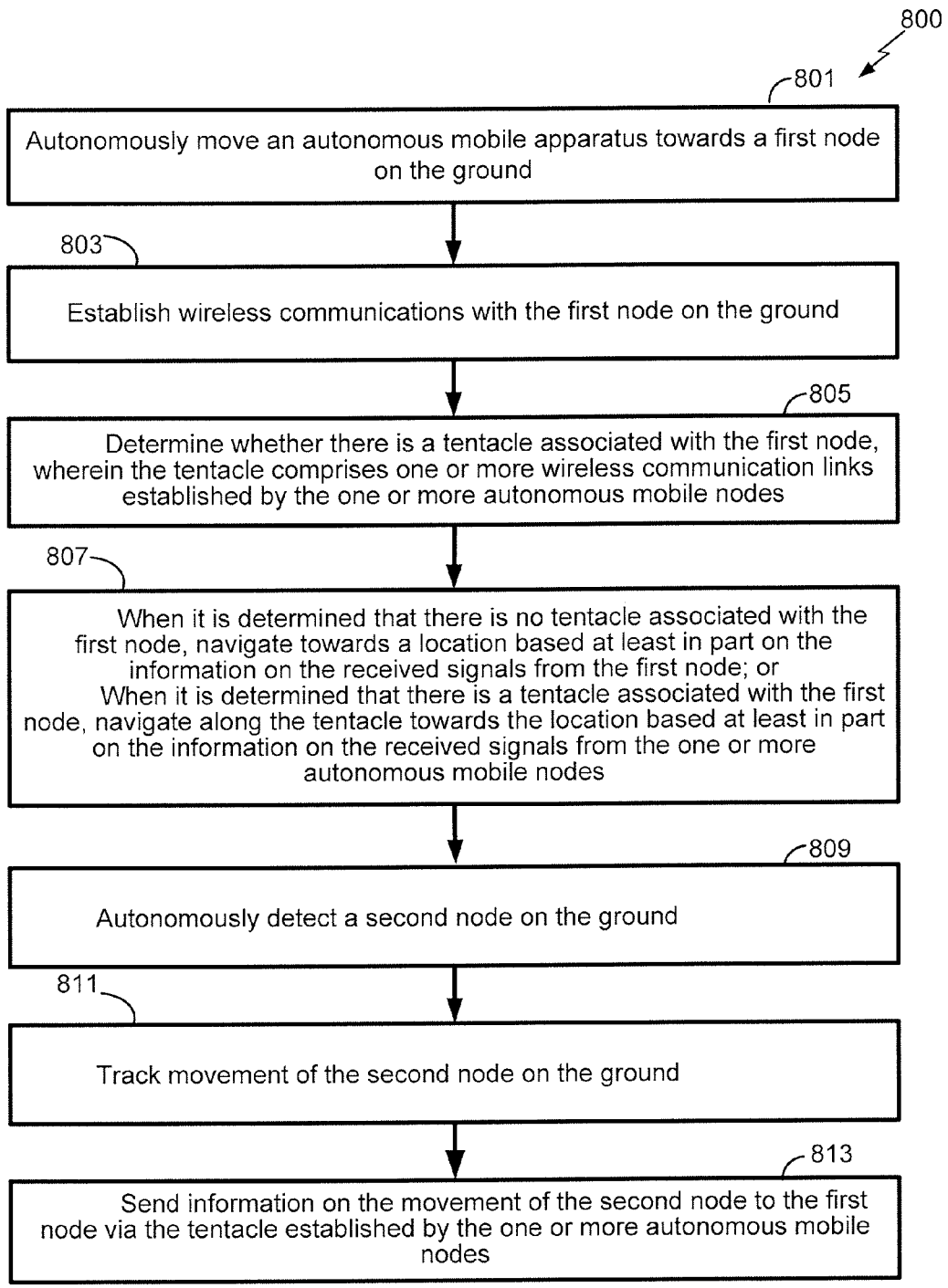
FIG. 8 is an example flowchart in accordance with certain aspects of the BioAIR methodology.

By way of example, FIG. 8 illustrates an example methodology for tracking the movement of the second node on the ground using one or more on board video/image sensors. At 801, one or more autonomous mobile nodes (or an autonomous mobile apparatus) fly or move towards a first node on the ground. At 803, the autonomous mobile apparatus establishes wireless communications with the first node on the ground. At 805, the autonomous mobile apparatus determines whether there is a tentacle (e.g., one or more tentacles) associated with the first node, where the tentacle comprises one or more wireless communication links established by the one or more autonomous mobile nodes.

At 807, when it is determined that there is a tentacle associated with the first node, the autonomous mobile apparatus navigates towards the second location based at least in part on the information on the received signals from the one or more autonomous mobile nodes. When it is determined that there is no tentacle associated with the first node, the autonomous mobile apparatus navigates towards the second location based at least in part on the information on the received signals from the first node.

At 809, using one or more autonomous mobile apparatuses the second node on the ground is detected. The detection of the second node can be performed by using equipment on board such as video and/or image processing equipment. The autonomous mobile apparatus may be equipped with video capturing or image processing equipment. When the tentacle grows such that the autonomous mobile apparatus comes within a video surveillance range of the equipment for the second node on the ground, the autonomous mobile apparatus searches and detects presence of the second node on the ground based on data received from one or more sensors (e.g., video surveillance sensors or image sensors) on board and/or information received from the one or more autonomous mobile nodes, as follows: (i) the digital signal processing algorithm software module operating in the video capturing or image processing equipment constantly identifies and analyzes identified objects (e.g., face detection and recognition) and compares against known set of objects (target objects); (ii) if a match is found, the quality of the match is translated into the appropriate field strength which will map into the example profile 400 shown in FIG. 4. (iii) Once the presence of the second node on the ground is detected based on the received data from the one or more sensors on board, video data relating to the second node is captured and relayed back to the first node via one or more deployed autonomous mobile nodes in the tentacle.

At 811, the movement of the second node on the ground is monitored and tracked by the on board video surveillance sensor. The speed and/or direction of the movement of the second node on the ground are constantly estimated and updated by the video sensor digital signal processing equipment, and their values control the motion (e.g., flying) of the autonomous mobile node which detected the target object Further, at 813, information collected on the movement of the second node on the ground is sent to the first node via the tentacle established by the one or more autonomous mobile nodes. In addition, or alternatively, the information collected on the movement of the second node on the ground may be transmitted to all the nodes via the tentacle. Therefore, as the tracked second node moves, the tentacle may extend, shrink or curve in response to the change in the movement of the tracked second node (e.g., in response to the change in the direction of a destination node field). As a result, using the BioAIR methodology described herein, a destination node for surveillance can be autonomously detected and monitored using one or more autonomous mobile nodes.

Figure 9A:
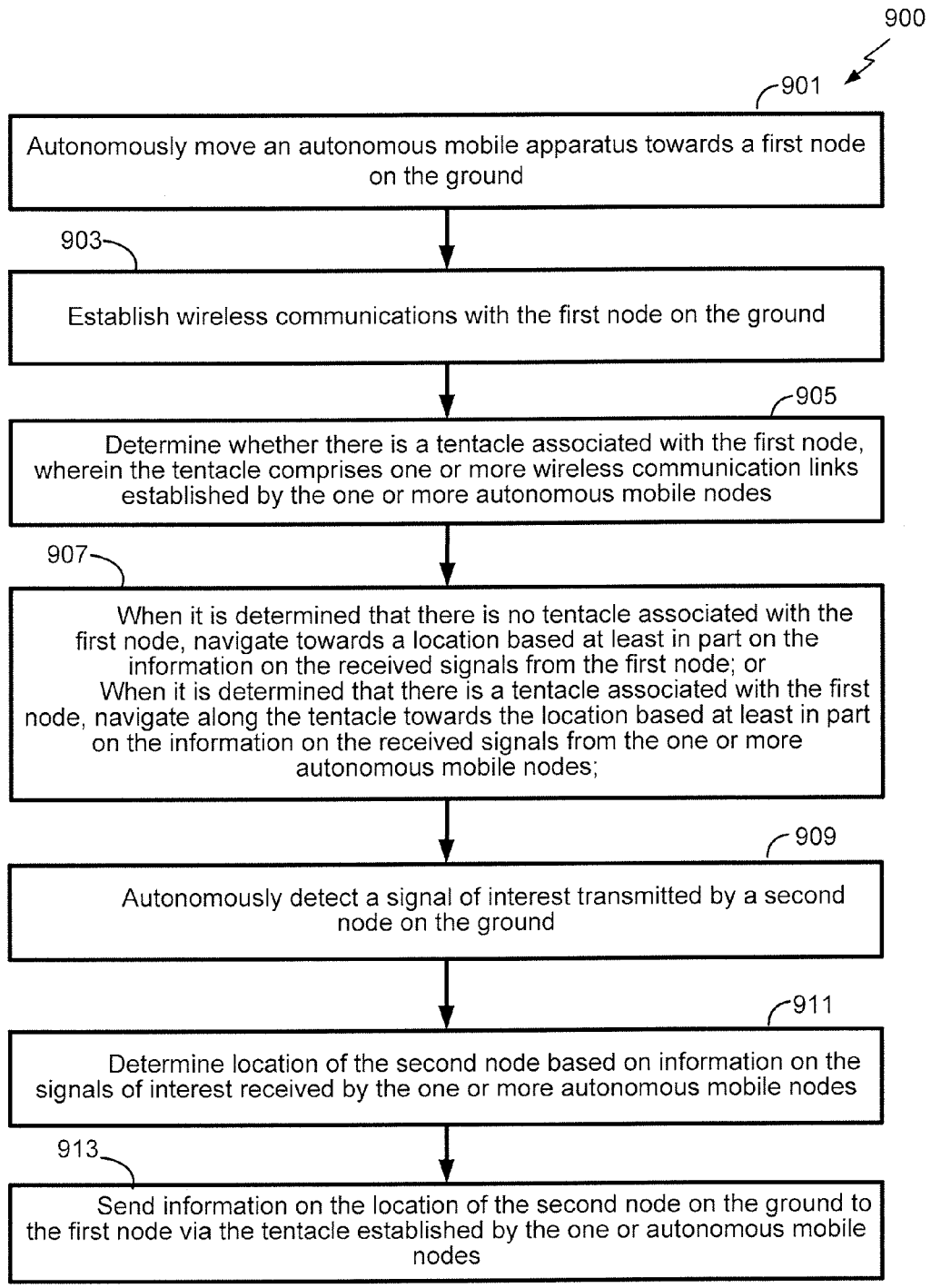
FIGS. 9A and 9B are example flowcharts in accordance with certain aspects of the BioAIR methodology.

Further, in accordance with certain aspects of the BioAIR methodology, the BioAIR methodology can also be used to identify or determine geographical location of a second node on the ground (e.g., a friendly or hostile destination) using radio frequency (RF) geo-location sensor on board. By way of example, FIG. 9A illustrates an example methodology for determining the location of the second node on the ground by detecting and tracking the RF signal emitted by the second node on the ground.

At 901, one or more autonomous mobile nodes including an autonomous mobile apparatus fly (or move) towards a first node on the ground.

At 903, the autonomous mobile apparatus establishes wireless communications with the first node on the ground.

At 905, the autonomous mobile apparatus determines whether there is a tentacle (e.g., one or more tentacles) associated with the first node, where the tentacle comprises one or more wireless communication links established by the one or more autonomous mobile nodes.

At 907, when it is determined that there is a tentacle associated with the first node, the autonomous mobile apparatus navigates towards a location based at least in part on the information received from the one or more autonomous mobile nodes. When it is determined that there is no tentacle associated with the first node, the autonomous mobile apparatus navigates towards the location based at least in part on the information on the received signals from the first node.

At 909, the autonomous mobile apparatus detects a signal of interest transmitted by the second node on the ground. For example, the autonomous mobile apparatus may be equipped with RF signal detection equipment on board. As the tentacle grows, the autonomous mobile apparatus scans for presence of a signal of interest within its wireless communication range, where the RF signal of interested may be transmitted by the second node on the ground. Any existing RF signal detection techniques may be used to detect the signal of interest from the second node on the ground. When the tentacle grows such that the autonomous mobile apparatus comes within a RF signal detection range for detecting presence of the second node on the ground, the autonomous mobile apparatus searches and detects the presence of the second node on the ground as follows: (i) the RF signal detection algorithm software module operating in conjunction with the RF geo-location sensor on board constantly identifies signals and analyzes the identified signals (e.g., modulation type, signal bandwidth, center frequency, and so forth), and compares them against a known set of signals in the search list; (ii) if a match is found, the quality of the corresponding signal is translated into field information including field strength as depicted in FIG. 4.

Further, (iii) once the presence of the second node is detected, details on the identified signal relating to the second node are captured and relayed back to the first node via one or more deployed autonomous mobile nodes in the tentacle; (iv) upon receiving the detected signal information transmitted over the entire tentacle, one or more extra autonomous mobile apparatuses coupled to the tentacle then move (e.g., fly) towards the first autonomous mobile apparatus till it detects the target second node on the ground. When at least three autonomous mobile nodes detect the same target second node using their respective on board RF signal detection sensor in conjunction with respective signal processing module or equipment, they communicate with each other their own coordinates (using on board PS) and estimate the location information (e.g., location coordinates) of the second node using a method of triangulation or the like; (v) as the second node may be mobile, the autonomous mobile nodes which detected the second node on the ground may each adjust its location to maintain a good signal match quality, and continuously share theirs coordinates to update the estimated location information of the second node on the ground.

At 913, the information on the determined location of the second node on the ground is sent to the first node via the tentacle established by the one or more autonomous mobile nodes. As a result, the BioAIR methodology described herein can be used to autonomously detect and locate the second node of interest on the ground using one or more on board RF signal detection sensors of the one or more autonomous mobile nodes.

Figure 9B:
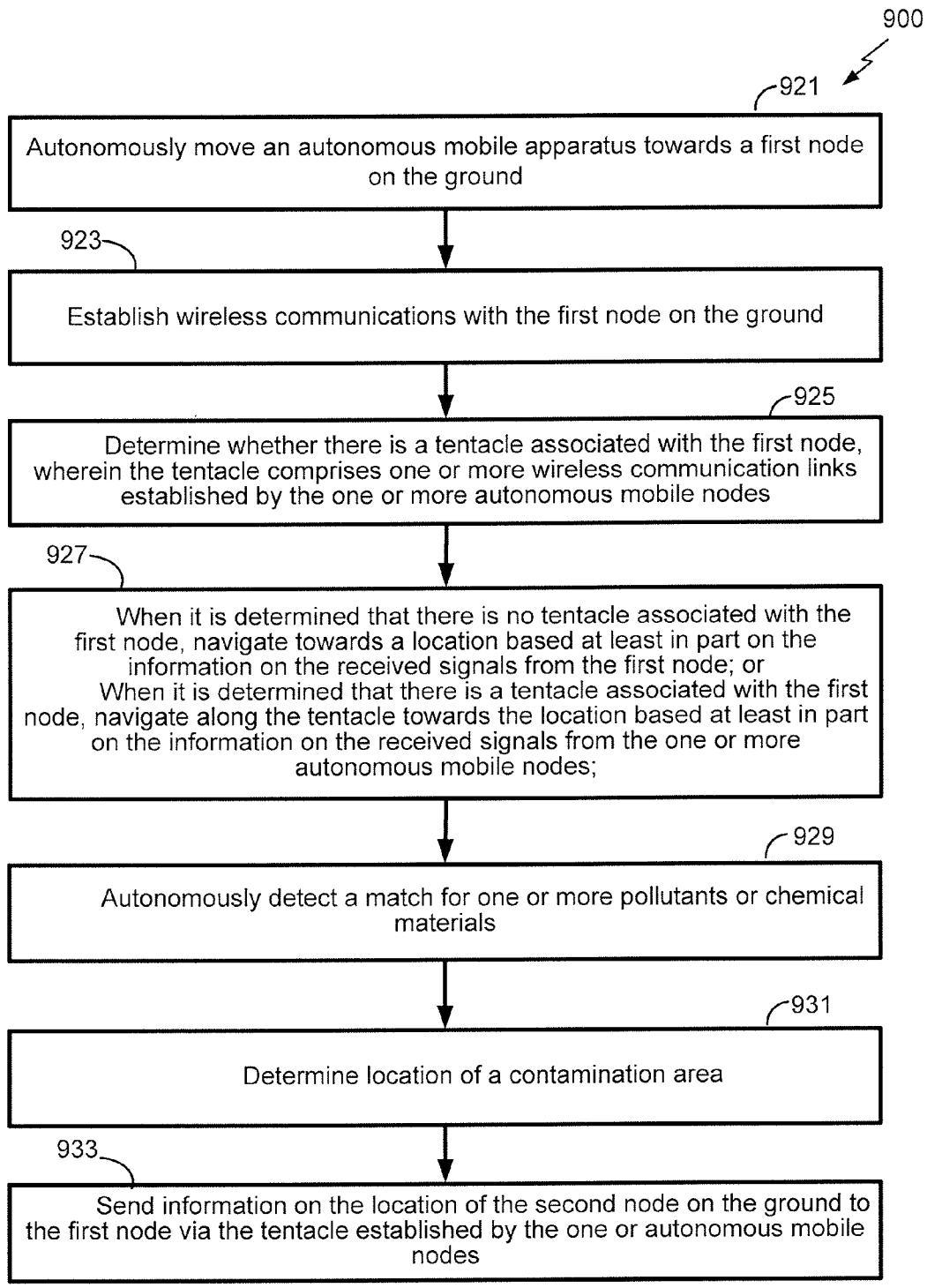

Further, in accordance with certain aspects of the BioAIR methodology, as shown in FIG. 9B, the BioAIR methodology can also be used to identify or determine geographical area contaminated by toxic pollutants or contaminant materials using one or more on board biological or chemical sensors. In this case, the second node may refer to a central location of a detected contamination area. By way of example, FIG. 9B illustrates an example methodology for determining the contamination area on the ground or in the air by detecting and tracking a level of contamination of target pollutants or chemicals around the second node.

At 921, one or more autonomous mobile nodes including an autonomous mobile apparatus fly (or move) towards a first node on the ground. At 923, the autonomous mobile apparatus establishes wireless communications with the first node on the ground. At 925, the autonomous mobile apparatus determines whether there is a tentacle (e.g., one or more tentacles) associated with the first node, where the tentacle comprises one or more wireless communication links established by the one or more autonomous mobile nodes.

At 927, when it is determined that there is a tentacle associated with the first node, the autonomous mobile apparatus navigates towards the pre-programmed second location (because it is before detection) based at least in part on the information on the received signals from the one or more autonomous mobile nodes. When it is determined that there is no tentacle associated with the first node, the autonomous mobile apparatus navigates towards the second location based at least in part on the information on the received signals from the first node.

At 929, the autonomous mobile apparatus detects a match for one or more pollutants or chemical materials. For example, the autonomous mobile apparatus may be equipped with biological and/or chemical sensor equipment on board. As the tentacle grows, the autonomous mobile apparatus scans for presence of a pollutant or chemical within its sensing range.

When the tentacle grows such that the autonomous mobile apparatus comes within a biological or chemical detection range for a contaminated area, the autonomous mobile apparatus searches and detects presence of the contaminated area as follows: (i) the biological or chemical material detection algorithm software module operating in the biological or chemical sensor on board constantly analyzes identified compounds captured by the biological or chemical sensor; (ii) if a match is found, the signal quality indicating the normalized concentration of the contaminant material is translated to the appropriate field strength to map into FIG. 4. (iii) Once the presence of the contamination is detected, details on the identified material relating to the contamination may be captured and relayed back to the first node via one or more deployed autonomous mobile apparatuses in the tentacle; (iv) upon receiving the detected signal information transmitted over the entire tentacle, one or more extra autonomous mobile apparatus attached to the tentacle then moves (e.g., flies) towards the first autonomous mobile apparatus till it detects the same contamination field. Each of the new autonomous mobile apparatus detecting the same contamination then begins to surround the contamination area as a result of the attraction and repulsion field strengths constantly updated by the autonomous mobile apparatuses based on the detection match quality and respective locations of the apparatuses.

At 931, With additional autonomous mobile apparatus detecting the same contamination area using their respective on board biological/chemical sensors, the apparatuses communicate with each other their own coordinates (using on board GPS) to approximate the area of contamination; (v) as the contamination area may be changing, the autonomous mobile apparatuses which detected the contamination adjusts its location to maintain a good contamination match quality, and continuously shares theirs coordinates to update the estimated contamination area.

At 933, the information on the estimated contamination area (i.e., the center location of the area identified as the second node location) is sent to the first node via the tentacle established by the one or more autonomous mobile nodes. As a result, the BioAIR methodology described herein can be used to autonomously detect contamination and estimate an approximate area using one or more autonomous mobile apparatuses with on board biological or chemical sensors.

Various aspects of the BioAIR methodology including aspects of the flow charts shown in FIGS. 2, 9A, and 9B may be implemented using hardware, software, or a combination thereof and may be implemented in one or more computer systems or other processing systems. Further, in accordance with various aspects of the present disclosure herein, one or more functionalities may be implemented with a "processing system" that may include one or more processors. Examples of such a processing system may include a computer system with a single- or multi-core processor, communication bus such as USB or Ethernet, one or more transceivers, and one or more onboard sensors, as shown in FIG. 10A.

FIG. 10A shows a system diagram illustrating an example of a hardware implementation of an apparatus 1000. An autonomous mobile node may include one or more apparatuses 1000 which include at least one processing system 1001. Also, alternatively, the apparatus 1000 can be any communications device embodied in an autonomous mobile node or a ground node. The processing system 1001 or the apparatus 1000 may be implemented as either a client or a server in a client-server environment or a distributed computing environment. In one implementation, the apparatus 1000 may include the processing system 1001, a transceiver interface 1006, a sensor interface 1007, a navigation interface 1008, and optically a user (human operator) interface 1109. The processing system 1001 may be a general purpose computer typically comprising a central processing unit or other processing device(s), an internal communication bus, various types of memory or storage media for instructions/code and data storage, and one or more network interface cards or ports for communication purposes. By way of example, the processing system 1001 includes one or more communications buses (generally represented as a communication bus 1002), one or more processors (generally represented by a processor 1003), computer-readable media (generally represented as a computer-readable medium 1005 including a non-transitory computer-readable medium), and one or more autonomous mobile communication components (generally represented as an autonomous mobile communication component 1004).

The communication bus 1002 may include any number of interconnecting buses, cables, or bridges depending on the specific application of the processing system 1001 and the overall design constraints. The communication bus 1002 links together various circuits including the one or more processors 1003, and the computer-readable medium 1005, and the autonomous airborne communication component 1004. The communication bus 1002 may also link various other circuits such as timing sources, peripherals, voltage regulators, and power management circuits, which are well known in the art, and therefore, will not be described any further. Various communication interface(s) may be provided to transfer data among various components, such as the processor 1003, computer-readable medium 1005, autonomous airborne communication 1004, transceiver interface 1006, sensor interface 1007, navigation interface 1008, user (human operator) interface 1009, etc. Examples of the communication interface may include a network interface such as an Ethernet (10/100/1000 Mbps), a serial communication port such as USB, Firewire, and RS-232, and customized circuits optimized for fast and reliable communication with individual interfaces attached.

The autonomous mobile communication component 1004 may include a hardware component, a software component, or a combination of both hardware and software components. The various features or functionalities described herein relating to the autonomous mobile communications may be implemented by the autonomous mobile communication component 1004, either alone or in combination with the processor 1003.

Figure 10B:
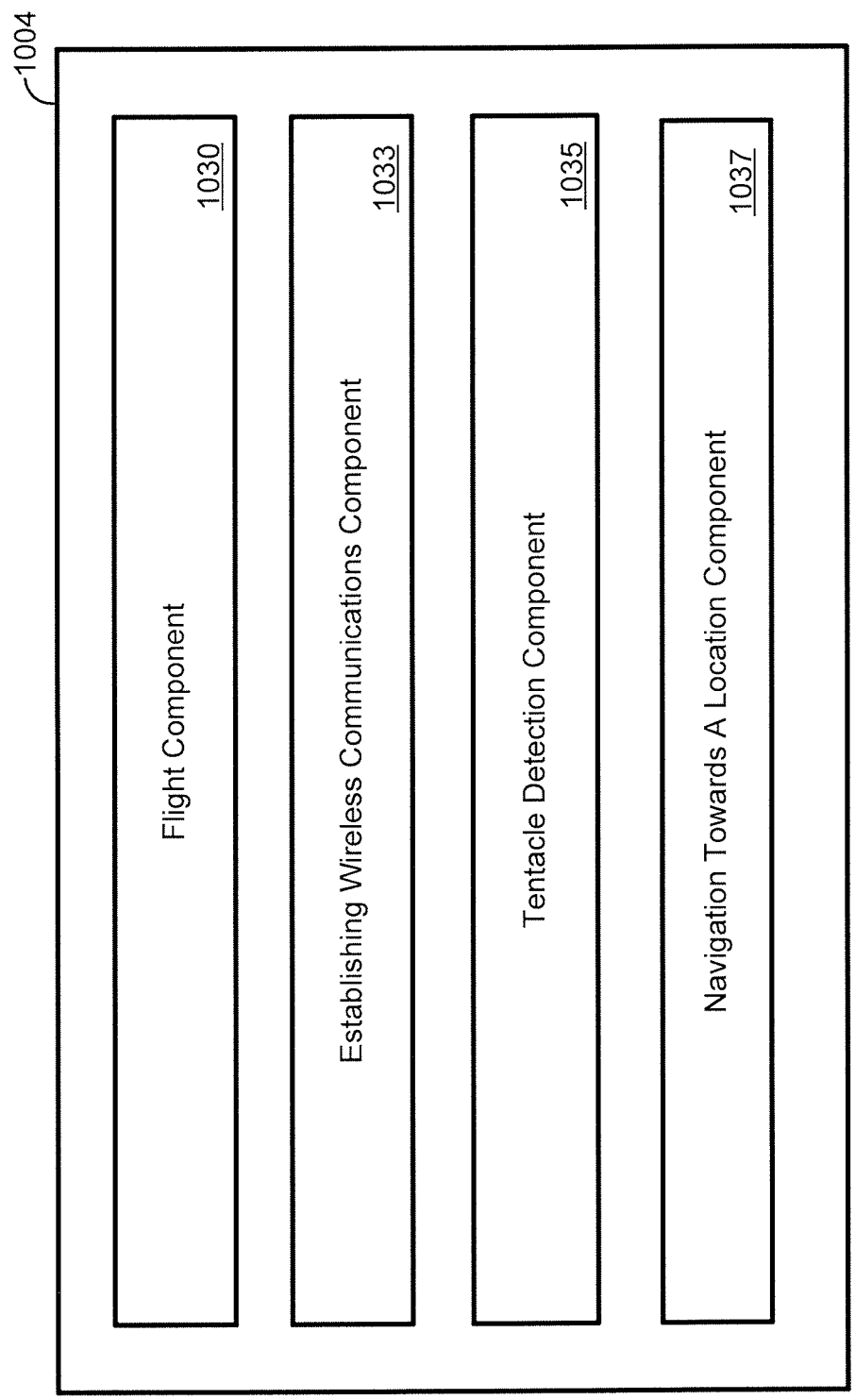

By way of example, as shown in FIG. 10B, the autonomous mobile communication component 1004 may include a flight component 1030, an establishing wireless communication component 1033, a tentacle detection component 1035, and a navigation towards a location component 1037. The flight component 1030 may be implemented as a component or module (e.g., hardware, software, or combination thereof) configured to autonomously fly an autonomous mobile apparatus towards a first node on the ground. The establishing wireless communication component 1033 may be implemented as a component or module (e.g., hardware, software, or combination thereof) configured to establish wireless communications with nodes on the ground (e.g., the first node and/or second node) or other autonomous mobile nodes deployed in the air. The tentacle detection component 1035 may be implemented as a component or module (e.g., hardware, software, or combination thereof) configured to determine whether there is a tentacle associated with the first node on the ground or with one or more autonomous mobile nodes deployed in the air, where the tentacle comprises one or more wireless communication links established by the one or more autonomous mobile nodes.

The navigation towards a location component 1037 may be implemented as a component or module (e.g., hardware, software, or combination thereof) configured to navigate to the first node, or navigate along the tentacle towards a location toward the second node based at least in part on the information received from the one or more autonomous mobile nodes, when it is determined that there is a tentacle associated with the first node. The navigation towards a location component 1037 may be further configured to navigate towards the second location based at least in part on the information received from the first node, when it is determined that there is no tentacle associated with the first node.

Referring back to FIG. 10A, the processor 1003 may include digital signal processors (DSPs), micro-processors, micro-controllers, gate arrays including field programmable gate arrays (FPGAs), programmable logic devices (PLDs), discrete hardware circuits, or other suitable hardware configured to perform the various functionalities described herein. The processor 1003 may be configured to be responsible for managing the communication bust 1002 and general processing, including execution of software or instructions stored on the computer-readable medium 1005. The software, when executed by the processor 1003, causes the processing system 1001 to perform various functions including functionalities relating to the present technology described herein. Also, the computer-readable medium may store data that are manipulated by the processor 1003 when executing software. That is, the software functionalities may involve programming, including executable instructions or code as well as associated stored data, e.g., files used for implementing techniques for the present technology disclosed herein including functions to autonomously establish, maintain, and repair a wireless communication network using autonomous mobile nodes deployed in the air.

In the present disclosure, software broadly include instructions, instruction sets, code, program code, programs, subprograms, software modules, applications, routines, objects, executables, procedures, functions, hardware description language, etc. The software may reside on a non-transitory computer-readable medium. The non-transitory computer-readable medium may include, by way of example, a magnetic storage device (e.g., a hard disk, a floppy disk, a magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a processor.

The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. Further, the software may be stored at other locations and/or transported for loading into an appropriate processing system. Software code or instructions for applications or other programming for the appropriate general purpose computer including the processing system may be stored at a different network location (e.g., a remote server) and wirelessly transmitted through a network for storage in memories of the processing system.

The transceiver interface 1006 provides a means for communicating wirelessly with other apparatus, such as an origin node, a destination node, or an autonomous mobile node. The transceiver interface 1006 may be configured to support short and/or long range wireless communications protocols including Ultra Mobile Broadband (UMB), IEEE 802.11 (Wi-Fi), IEEE 802.16 (WiMAX), IEEE 802.20, Ultra-Wideband (UWB), Bluetooth, and/or other suitable protocols. Alternatively, the transceiver interface 1006 may also support any other proprietary wireless communications protocols.

Figure 11:
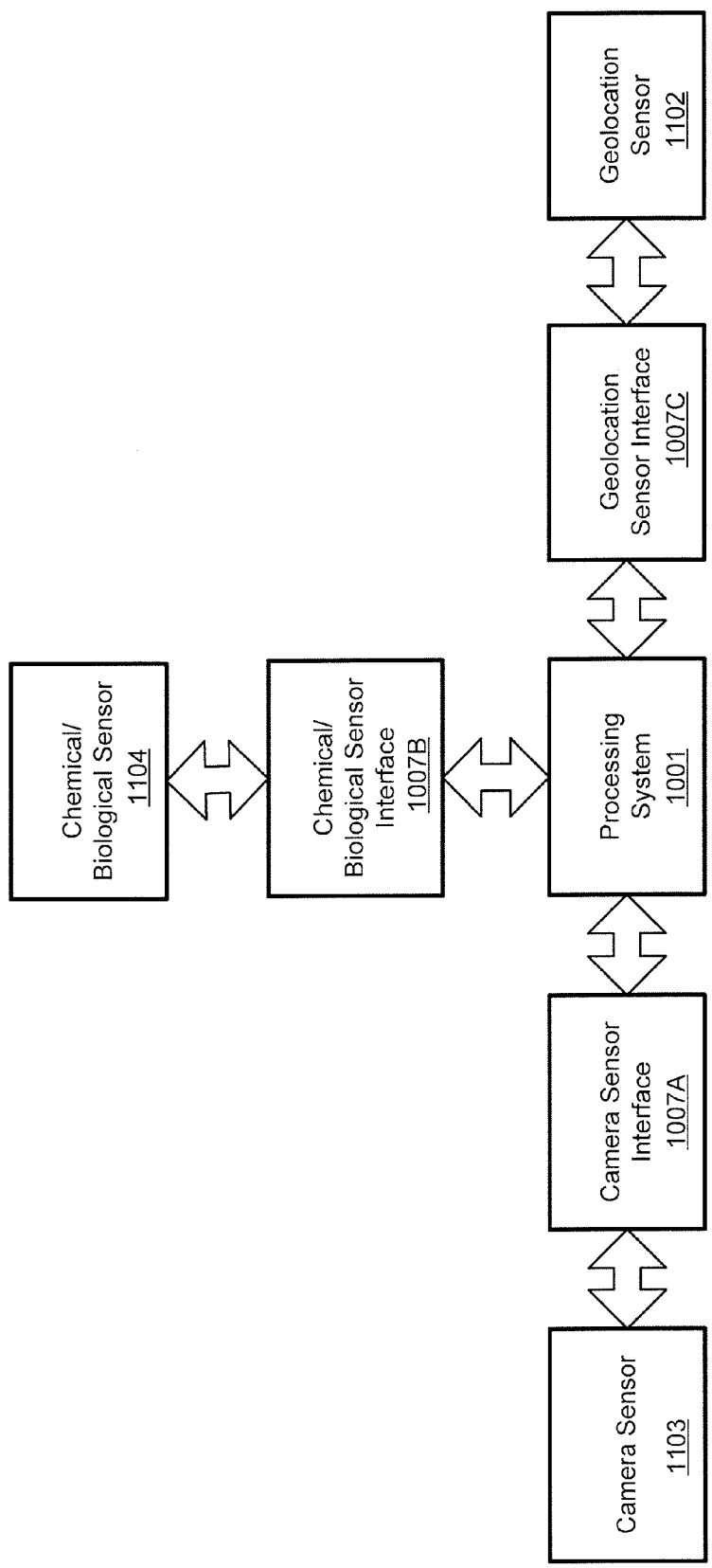
FIG. 11 illustrates a functional block diagram conceptually illustrating interactions between an apparatus and various on board sensors.

The sensor interface 1007 provides an interface for communicating with one or more sensors on board an autonomous mobile node (as shown in FIG. 11). Also, the sensor interface 1007 may include an interface which is often referred to as "Application Programming Interface" (API). The API may be implemented in the form of a "device driver" software module with respect to Processor 1003 inside the processing system 1001. When requested by a system function call running inside the processing system 1001, via this API, the requested sensor interface connected to the processing system 1001 provides data in the form of a tuple, for example, <function name, timestamp, device identifier, send/receive data direction flag, sensor's internal parameter/object classification identifier, number of data fields, array of data values> to the processor 1003 via the API. Further, each sensor on board may be configured to convert its own sensor data to this tuple format either periodically (e.g., every 3 seconds) or upon request by the processing system 1001 via the API. Examples of candidate sensor platforms include, but not limited to, geo-location sensors including GPS, radio frequency sensors, network quality sensors, chemical sensors, biological sensors, camera/image sensors, etc., which may be installed on each autonomous mobile node.

The navigation interface 1008 provides a means for communicating with an autopilot module or components of an autonomous mobile node. The autopilot component provides an Application Programming Interface (API) through which the apparatus 1000 can obtain data such as various location information, e.g., GPS coordinates of interest, and issue commands, such as a move command to fly the autonomous mobile node to a specified coordinate location.

Figure 10C:
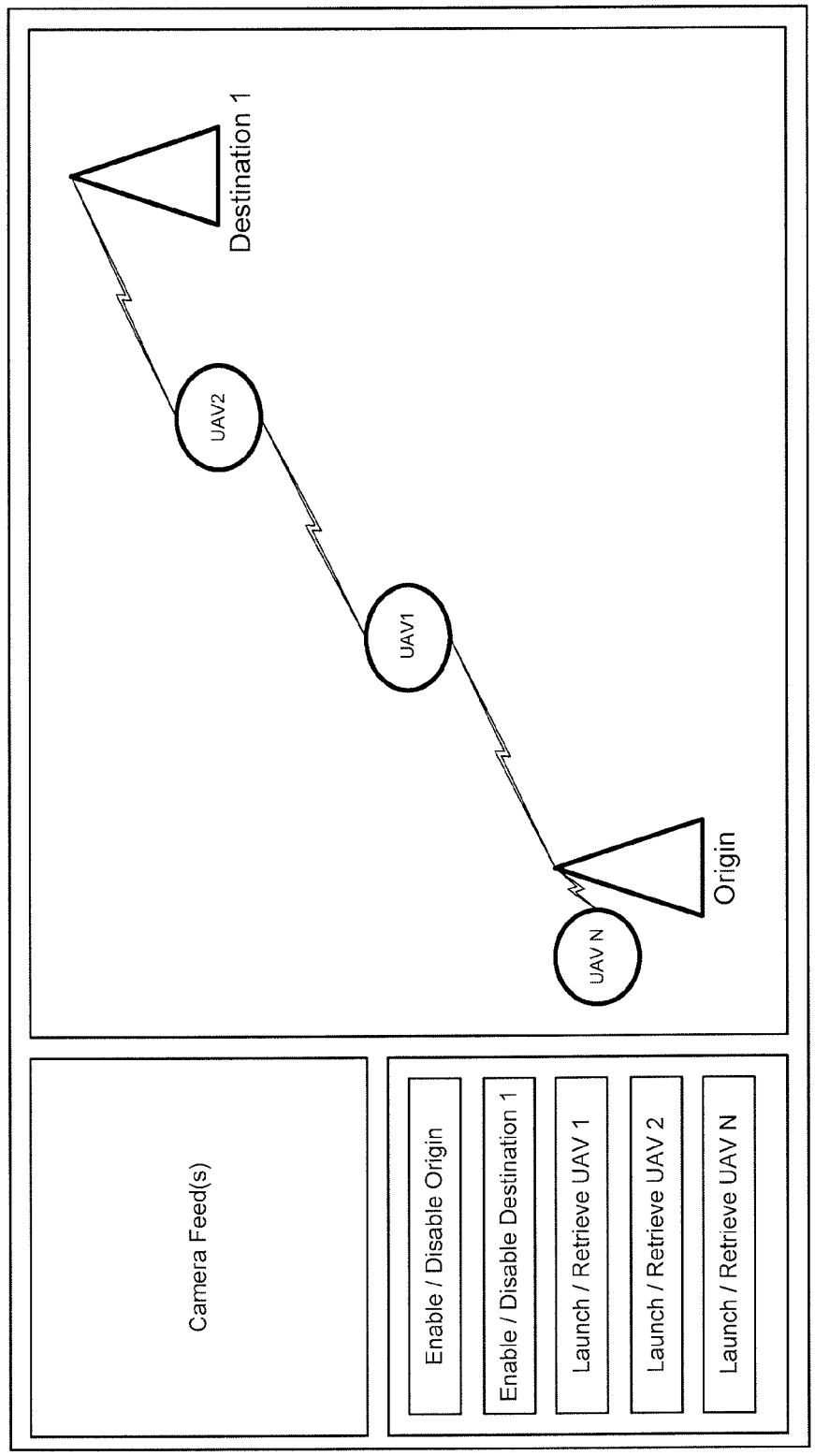

The user (human operator) interface 1009 is an optional additional component which may include a keypad, a display, a speaker, a microphone, a joystick, or other user interface elements. The user interface 1009 may be used to communicate with the processing system 1001. For example, the location information of an origin node and or a destination node can be input to the processing system 1001 of an autonomous mobile node via the user interface 1009 before launch or deployment. Also, the user interface 1009 may be used to produce an example graphical user interface (GUI) on an operator console, as shown in FIG. 10C. The centralized GUI interface of FIG. 10C may help a human operator on the operator console to monitor and/or override certain autonomous behavior of any networked autonomous mobile node.

In an aspect, shown in the FIG. 11 is a system diagram illustrating how the processing system 1001 may use the various sensor interfaces including three exemplary sensors: geo-location sensor (1102), camera sensor (1103), and chemical/biological sensor (1004). As noted above, each of the sensor interfaces 1007A, 1007B, and 1007C provides a means for communicating with the respective onboard sensor platform. Specifically, each of the three interfaces (1007A, 1007B, and 1007C) provides data in the form of tuple, that is, <function name, timestamp, device identifier, send/receive data direction flag, sensor's internal data/object classification identifier, number of data fields, array of data values>, either periodically or upon request by the processor 1003.

In certain aspects of the BioAIR methodology, various measurement data, such as GPS, received signal quality, communication quality measurements in terms of signal strength, alternate sensors or measurement metrics may be used. The alternate sensors or measurement metrics may include other radio frequency measurements via the radio frequency based geo-location sensor 1102 (e.g., from Cognitive Radio Architectures), camera identification or object tracking measurements via the camera or image sensor 1103, biological or chemical sensor measurements of air composition via the chemical/biological sensor 1104, network measurements, such as message delivery quality, etc., via a network quality sensor. These sensors or sensor systems are capable of providing improved situational awareness such as the criticality of each node in a communication network or a tentacle.

In an aspect, the processing system 1101 may include a critically sensitive control (CSC) component, which determines the criticality or importance of a node within the communication network, and attempts to reinforce important locations in the tentacle. For example, using the geo-location sensor 1102, the criticality of an autonomous mobile node at a specific location may be determined by a measured amount of data traffic passing through the autonomous mobile node (e.g., measured in Mbps), or determined by a priority of one or more messages being routed through the autonomous mobile node.

Further, each autonomous mobile node may be assigned a criticality value based on the measured amount of data traffic passing through the autonomous mobile node or the priority of the one or more messages being routed through the autonomous mobile node. When the criticality value of an autonomous mobile node exceeds a predetermined threshold, the CSC component may ensure that any available Extra nodes are guided towards that autonomous mobile node and positioned between its parent and child nodes, thereby reinforcing a segment of the tentacle established by the autonomous mobile node with the high criticality value. Essentially, each strategically placed Extra node may reinforce the network by reducing the criticality of neighboring nodes by routing some of their traffic through it. Further, in an aspect of the present disclosure, the CSC component or functionality can reside in the origin node or any one of the one or more autonomous mobile nodes forming the tentacle originating from the origin node.

Figure 12A:
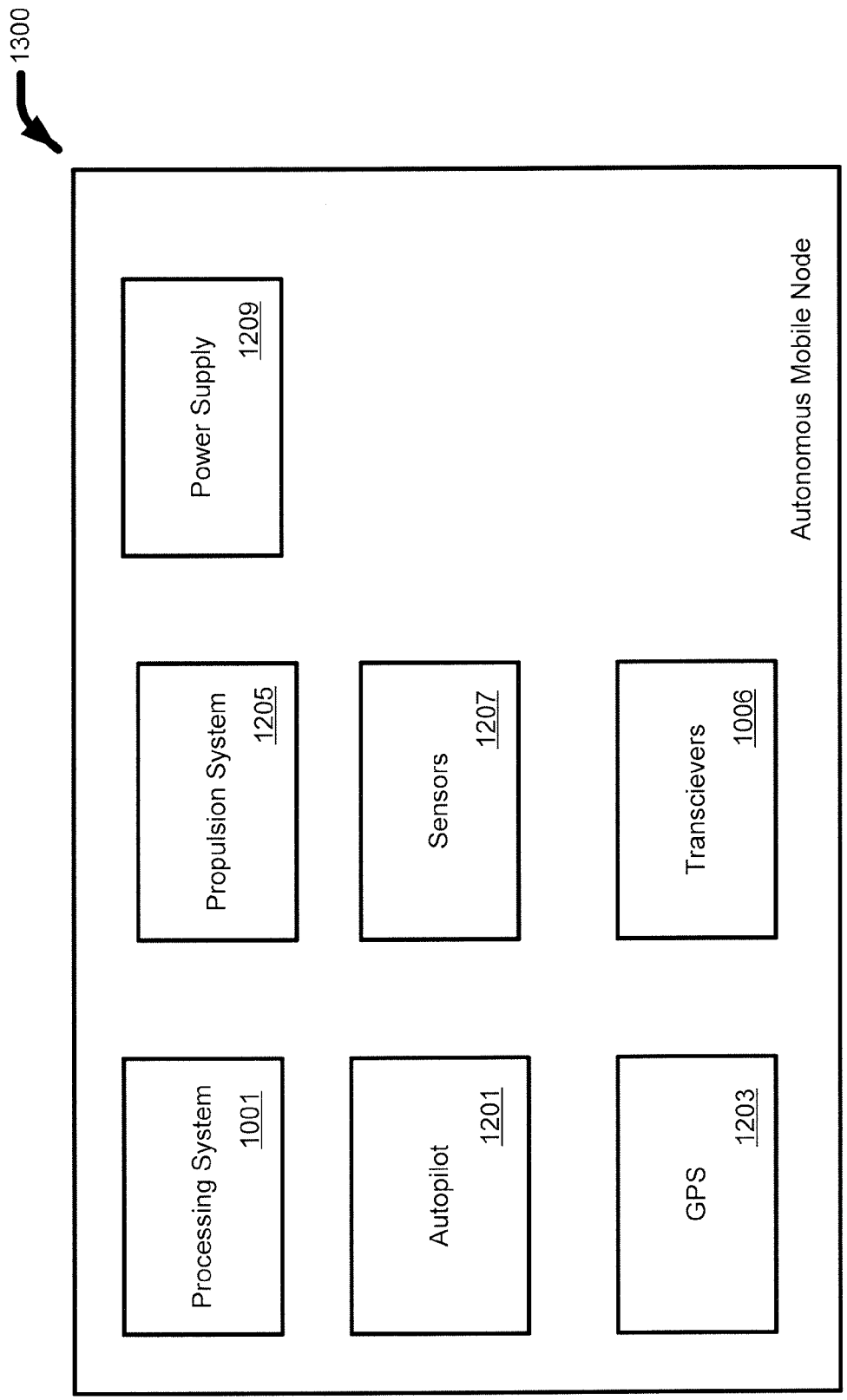
FIGS. 12A, 12B, and 12C conceptually illustrate components of an apparatus in certain aspects of the BioAIR methodology.

FIG. 12A illustrates an example of an autonomous mobile node (AMN), such as UAV 1, including some example components in certain aspects of the BioAIR methodology. The autonomous mobile node 1200 shown in FIG. 12A is configured to include at least a processing system 1001, an autopilot 1201, a GPS 1203, a propulsion system 1205, sensors 1207, transceivers 1006 and a power supply 1209.

Figure 12B:
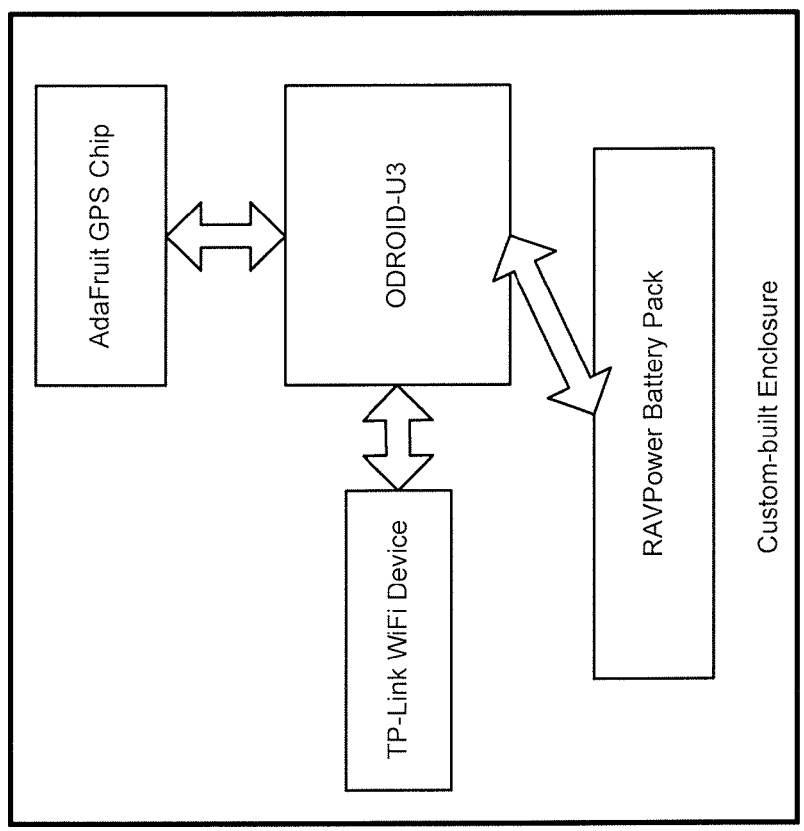

FIG. 12B also illustrates one example embodiment of the autonomous mobile node including a processing system (e.g., ODROID-U2), a GPS (e.g., AdaFruit GPS Chip), a transceiver (e.g., TP-Link Wi-Fi Device), and a power supply (e.g., RAVPower Battery Pack), in certain aspects of the BioAIR methodology. Specifically, the processing system is a HardKernel ODROID-U2, the GPS is an Adafruit Ultimate GPS Breakout v3, the transceiver is a TP-LINK TL-WN722N Wireless N150 USB adapter, and the power supply is a RAVPower Element 10400 mAh external USB battery.

Figure 12C:
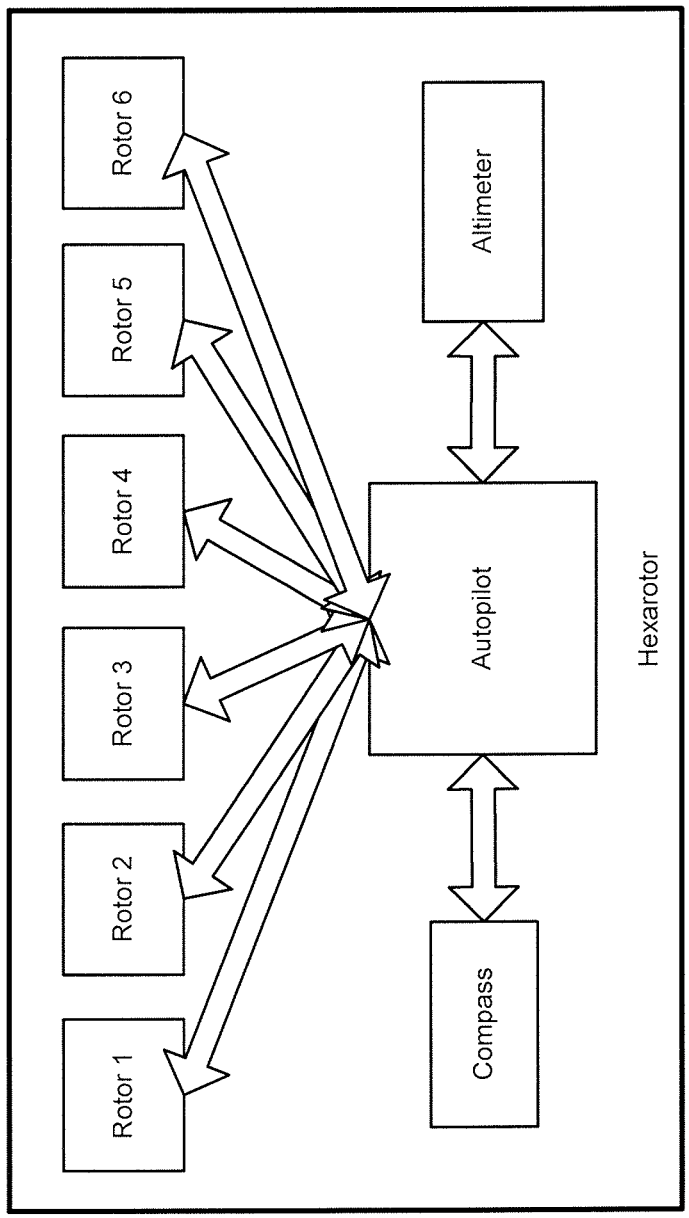

FIG. 12C is one feasible embodiment of the propulsion system 1205, sensors 1207 and autopilot 1201, in certain aspects of the BioAIR methodology. Specifically, the propulsion system 1205 may include six (6) rotors, the sensors may include an electronic compass and altimeter, while the autopilot may include a dedicated Raspberry Pi with proprietary software.

The autopilot 1201 is responsible for autonomous control and operation of the autonomous mobile node and measures various states of the autonomous mobile node. The autopilot 1201 may include a barometer and an inertial measurement unit (IMU) with one or more accelerometers, one or more gyroscopes and/or one or more magnetometers providing accelerations and/or angular rates in the autonomous mobile node.

The GPS 1203 may include a GPS receiver to determine location information such as GPS coordinates of the autonomous mobile node. The sensors 1207 may include various types of on-board sensors, such as the radio frequency based geo-location sensor 1102, the chemical/biological sensor 1104, the camera sensor 1103, the network quality sensor 1101, etc. as shown in FIG. 11. Using the on-board sensors, various types of data (or measurement data) may be obtained and processed for different purposes. This processing inside each sensor is then translated into a vector consisting of a direction and magnitude components as part of the specific API implementation, which is then provided to the processing system 1001 via the API. In another aspect, the measurement data from various sensors can be used to autonomously monitor and/or control the operation of the autonomous mobile node. Alternatively, the measurement data may be used to identify and/or track a target node on the ground as described in reference to FIGS. 8 and 9 above.

The transceiver interface 1006 may include one or more transmitters and/or receivers for communicating with one or more nodes on the ground or with other autonomous mobile nodes deployed in the air. As noted earlier, the transceiver interface 1006 may be configured to support various short and long range wireless communications protocols including UMB, Wi-Fi, WiMax, IEEE 802.20, UWB, Bluetooth, and/or other suitable protocols. The power supply 1209 may include various types of batteries or power supplies for providing power to electronics and various components on board the autonomous mobile node.

Further, the autonomous mobile node may include one or more cameras 1103, as an optional component, such as a video camera or a snapshot camera for capturing video data or image data. The captured video data or image data may be transmitted to other node including an adjacent autonomous mobile node, via the transceiver 1006. Further, the captured video data or image data may be transmitted to the origin node through one or more autonomous mobile nodes forming a tentacle (e.g., via relaying of the captured video data or image data from one autonomous mobile node to another autonomous mobile node in the tentacle). In one implementation, as the autonomous mobile node navigates, the camera may wirelessly stream video in real time via other autonomous mobile nodes in the tentacle to another autonomous mobile node or an origin node for further processing of the captured video.

Figure 13:
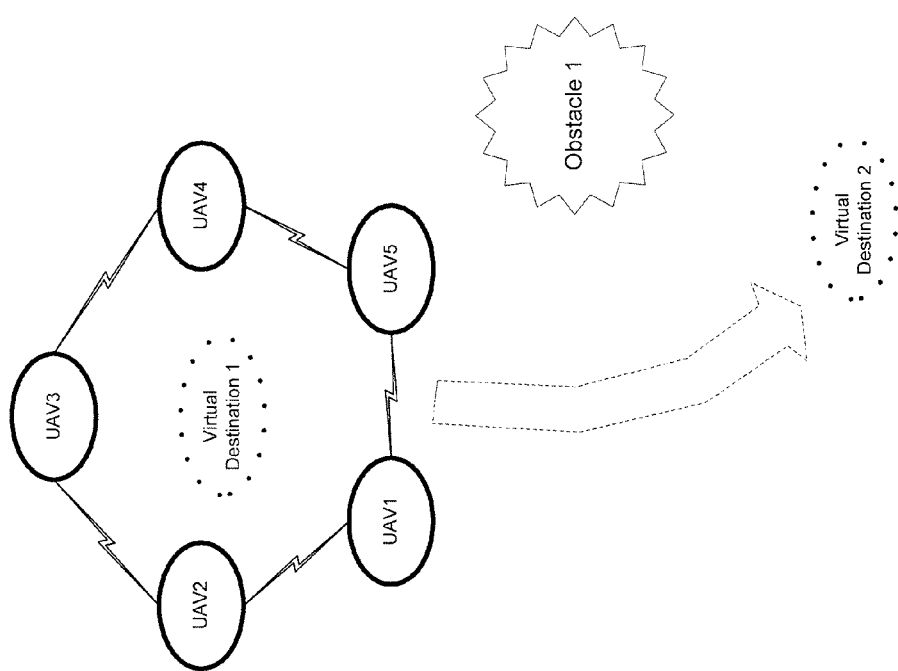
FIGS. 13 and 14 conceptually illustrate collaborative navigation in accordance with certain aspects of the BioAIR methodology.
Figure 14:
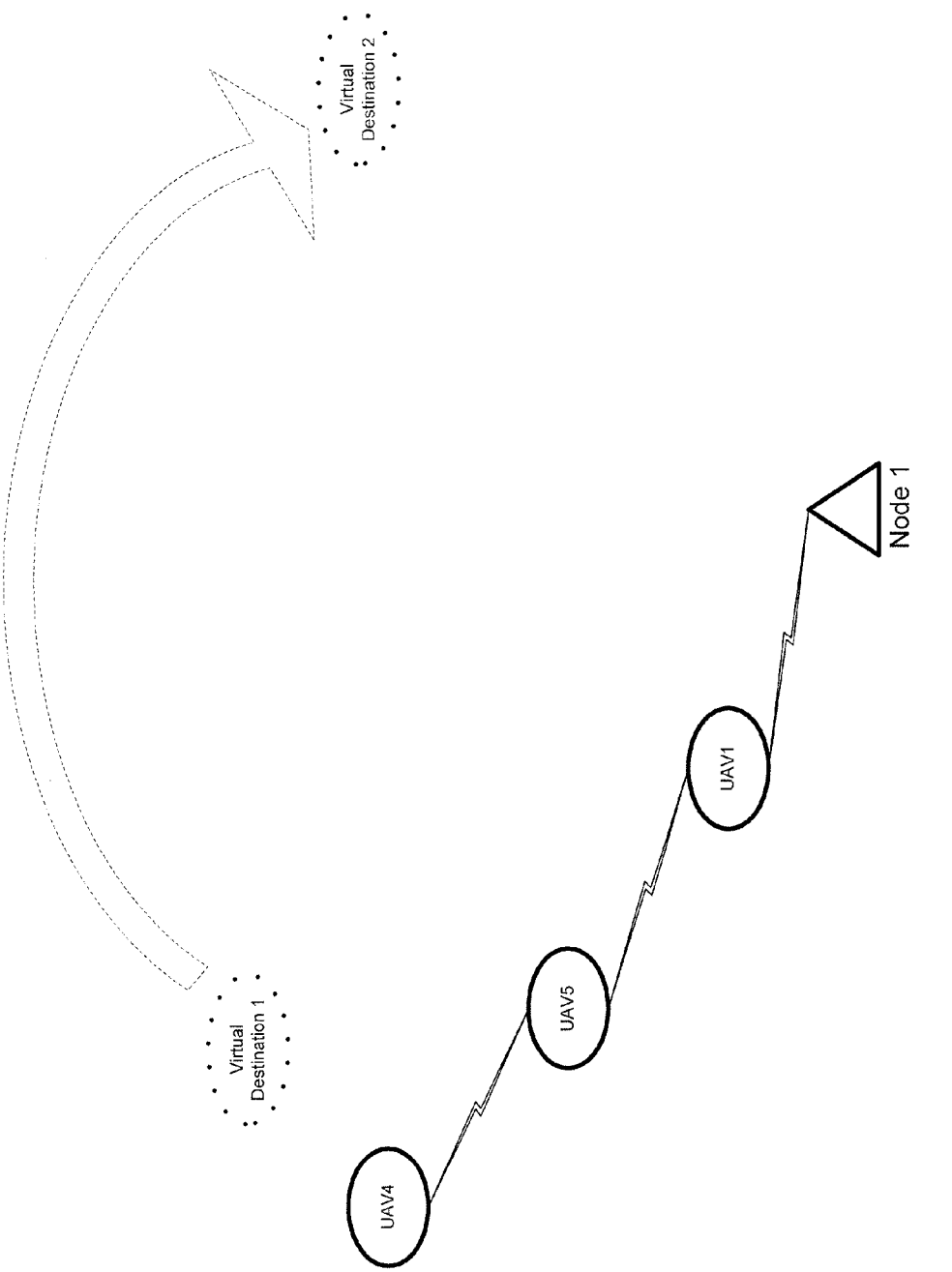

FIGS. 13 and 14 illustrate example collaborative navigation in accordance with certain aspects of the BioAIR methodology. The example collaborative navigation may be achieved by altering a profile of fields and assigning virtual destination or origin locations for the purpose of changing the overall shape and/or response of the communication network deployed. For example, in FIG. 13 the communication network may not be tethered to an origin node. Instead, all autonomous mobile nodes deployed in the air are attracted to a virtual location. The autonomous nodes surround the virtual location, and moving the virtual location may result in forming an efficient mobile escort or defense perimeter. Also, additional fields from sensed obstacles could be added directly into the field strength calculation to ensure the safety of autonomous mobile nodes (i.e. obstacle avoidance) as they move in the environment under communication constraints. Similarly, as shown in FIG. 14, the communication network is a tentacle sweeping an area by moving a virtual destination defined along an arc at its maximum range.

As such, the BioAIR methodology described herein provides many advantages and benefits as described above. Among many others, the BioAIR methodology may enable multiple autonomous mobile nodes to autonomously control themselves based on various onboard sensor data measurements and/or network performance. Further, the BioAIR methodology may enable autonomously coordinating the motion of autonomous mobile nodes deployed in the air in a distributed manner, preventing a formation of suboptimal network, dealing with various types of autonomous mobile node failures, repair and reinforcement of the critical locations of the communication network using the multiple autonomous mobile nodes deployed in the air. Further, the BioAIR methodology may enable autonomously detecting a signal of interest transmitted by a node, determining location of the node based on information received from one or more autonomous mobile nodes, and/or dynamically tracking movement of the node. Further, the BioAIR methodology may enable autonomously detecting presence of a contaminant material and determining location of a contamination area based on information received from one or more autonomous mobile nodes.

In another aspect of the BioAIR methodology, various functionalities relating to the BioAIR methodology disclosed herein may be implemented using software, hardware, and any combination of software and hardware. Examples of algorithm pseudocode may include pseudocode relating to functions such as "main," "communicate," and "move," as follows.

```
[Pseudocode: Main]
Main
    Set the coordinates of the origin and destination from file
    Start communications thread calling Communicate every 0.2 seconds
    Start motion thread calling Move every 0.5 seconds
End Main
[Pseudocode: Communicate]
    Communicate
        Do
            Get a broadcasted message containing values from an adjacent
            node
            If the adjacent count > local count
            If the adjacent node is the origin or destination
                Set the stored origin and destination coordinates
            End If
            If the adjacent tentacle state is complete
                If other destination nodes exist
                    Set coordinates to the next destination
                End If
            Else if the adjacent tentacle state is damaged
                If the local role is reinforce
                    Set the local role to free
                Else if the local role is tip or backbone
                    Hold position
                End If
            End If
            Set the local tentacle state to adjacent tentacle state
            If the local role is tip and adjacent role is tip or backbone
                Set the local role to backbone
            End If
        End If
        Set tentacle proximity to 0
        For each adjacent node
            If adjacent role is origin or destination or backbone or reinforce
                Set tentacle proximity to tentacle proximity + 1
            End If
        End For
        If the tentacle proximity > 1 and the anchor is unknown
            If the local role is free and the adjacent role is backbone
                Set the local role to reinforce
                Set the anchor to the adjacent node
            Else if the adjacent role is reinforce and the local role is backbone
                Set the anchor to the adjacent node
            End If
        End If
        If the tentacle state is complete and the local role is tip or the adjacent
        role
        is tip
            Set the tentacle state to damaged
        End If
            Broadcast a message containing local values to all adjacent
            nodes
        While true
End Communicate
[Pseudocode: Move]
Move
    Do
        Set x-force to the difference between the x-coordinate and
destination's x-coordinate
        Set y-force to the difference between the y-coordinate and
destination's y-coordinate
        Set next attractor to 0
        Set next position to 0
        For each adjacent node
            If adjacent tentacle position > next position
                Set next attractor to adjacent node
                Set next position to adjacent tentacle position
            End If
        End For
        For each adjacent node
            If adjacent signal > maximum signal
                Set factor to signal – maximum signal normalized
            Else if adjacent signal < minimum signal
                Set factor to signal – minimum signal normalized
            Else
                Set factor to 0
            End If
            If adjacent role is destination and factor > 0
                Set factor to 0
            Else if adjacent role is origin or tip or backbone or
            destination
                Continue
            Else if role is tip or backbone
                Set factor to 0
            Else if role is extra
                Set factor to 0
            Else if factor < 0
                Set factor to 0
            End If
            Set additional-x-force to factor * normalized distance in
x-axis to adjacent node
            Set additional-y-force to factor * normalized distance in
y-axis to adjacent node
            If adjacent role is destination
                Set x-force to x-force + additional-x-force
                Set y-force to y-force + additional-y-force
                If local role is free and tentacle state is complete
                    Set local role to extra
                End If
                If local role is extra
                If other destination nodes exist
                    Set coordinates to the next destination
                Else
                    Change the destination coordinates to the origin
                End If
                End If
            Else if adjacent role is origin
                If next attractor is 0
                    Set x-force to x-force + additional-x-force
                    Set y-force to y-force + additional-y-force
                End If
                If local role is orphan
                    Set local role to free
                End If
                If local role is free and tentacle state is complete
                    Set local role to extra
                End If
            Else if adjacent role is tip and local role is not backbone
                Set x-force to x-force + additional-x-force
                Set y-force to y-force + additional-y-force
                If local role is orphan
                    Set local role to free
                End If
            Else if adjacent role is backbone
                If local role is backbone
                    Set x-force to x-force + additional-x-force
                    Set y-force to y-force + additional-y-force
                Else if adjacent node is next attractor
                    Set x-force to x-force + additional-x-force
                    Set y-force to y-force + additional-y-force
                If local role is orphan
                    Set local role to free
                End If
            Else if adjacent role is extra
                Set x-force to x-force + additional-x-force
                Set y-force to y-force + additional-y-force
            Else if adjacent role is free and local role is free
                Set x-force to x-force + additional-x-force
                Set y-force to y-force + additional-y-force
```

```
            End If
        End For
        If x-force < threshold and y-force < threshold
            Set equilibrium to true
        Else
            Set equilibrium to false
        End If
        If there are no adjacent nodes
            Set local role to orphan
        Else if local role is tip and equilibrium is true
            Set x-force to 0
            Set y-force to 0
        Else if local role is backbone and adjacent nodes < 2
            Set local role to tip
            Change local tentacle state to damaged
        End If
        If local role is orphan
            Set x-force to the difference between the x-coordinate and
origin's x- coordinate
            Set y-force to the difference between the y-coordinate and
origin's y- coordinate
        Else if local role is free and equilibrium is true or adjacent role
        is
        destination
            Set local role to tip
            Set tentacle position to tentacle position + 1
            If adjacent role is destination
                Set tentacle state to complete
        End If
        Send desired UAV coordinates with x-force, y-force
    While true
End Move
```

Having provided detailed descriptions of the BioAIR methodology, described below are detailed descriptions of the present technology, the BioAIM systems and techniques ("BioAIM methodology"), which further enhance operation and performance of the BioAIR methodology.

In an aspect, the present disclosure provides an approach to detecting anomalies and providing decision support to a human operator by identifying possible causes and recommending corrective measures. In contrast to existing operation of an autonomous mobile node such as an unmanned aerial vehicle (UAV) or unmanned airborne node (UAN) where a single operator remotely controls an individual UAV, the present technology described herein controls an entire swarm or system of UAVs or UANs in a distributed manner. Also, among many advantages of the present technology, one is to provide technology with robustness to faults and failures, i.e., in the present technology described herein there is no single point of failure that the damage repair mechanisms cannot recover from. Further, in monitoring and controlling the system of UAVs, the lack of centralization may make it difficult to identify if the overall system has encountered any unforeseen or anomalous circumstances.

In accordance with an aspect of the present disclosure, however, expected or normal behavior of an autonomous mobile node or an autonomous system of one or more unmanned airborne nodes (e.g., a tentacle) and its underlying autopilot control system can be learned ("learned expected or normal behavior"). The learned expected or normal behavior can be stored and used to identify any deviations from the norm or anomalies. For example, the anomalies of an autonomous mobile node may include deviations from an expected flight path, e.g., moving away from a destination node, or mechanical failures of the autonomous mobile node, etc. In another aspect, in addition to identifying anomalies, recommendations can be made to correct the anomaly, enabling a single operator to monitor multiple swarms simultaneously.

The present disclosure provides an example scheme or technique for learning normal behavior of an autonomous mobile node, detecting an anomaly in an action of the autonomous mobile node or a tentacle (or a wireless communication network), identifying and providing information on potential causes of the anomaly, and providing timely decision support in the form of recommendations or taking any remedial action by the autonomous mobile node. Further, in defining normalcy in actions of an autonomous mobile node (or behavior of an autonomous system such as a tentacle), current actions of the autonomous mobile node (or current behavior of the tentacle) are compared with its expected actions (or normal behavior) based on learned knowledge of previous actions of the autonomous mobile node (or behavior of the tentacle). Given specifications of actions of an autonomous mobile node, such as models of normal or anomalous actions of the autonomous mobile node, one or more action comparison mechanisms may return a node metric identifying a degree of deviation for the autonomous mobile node. Also, given models of normal or anomalous behaviors of the tentacle, one or more action comparison mechanisms may return a system metric identifying a degree of deviation for the behavior of the tentacle. The present technology described herein provides systems and methods to determine a basic model or specification of the expected behavior of the autonomous mobile node, while training under controlled conditions and in operational environments. Also, it is noted that the basic model or specification of the expected behavior of the tentacle comprising multiple autonomous mobile nodes can be similarly determined as described herein with respect to the autonomous mobile node.

In another aspect, an example of a formal mechanism is provided for building a higher level language that will make anomaly detection technology relevant and useful to the human operator who must manage remote autonomous entities on an intermittent, asynchronous basis in emerging autonomous systems. Further, in an aspect, the present disclosure facilitates efficient information transaction mechanisms between the operator and underlying autonomous systems. For example, a user interface layer and associated dialog processes can be created, such that the operator is made aware of which underlying behaviors are operating as normal, and which underlying behaviors are suspected of being anomalous. Further, in an aspect, a set of feasible actions to be taken or recommendations to be considered may be displayed to the user via one or more user interfaces at a central location or command center, such as an origin node.

The present disclosure may be viewed as an extension of Surprise-Based Learning (SBL) algorithm disclosed in an article, "Surprise-Based Learning for Developmental Robotics," N. Ranasinghe and W- M. Shen, Learning and Adaptive Behavior for Robotic Systems, LAB-RS 08, 65-70, August 2008, which is incorporated herein by reference in its entirety.

Figure 15A:
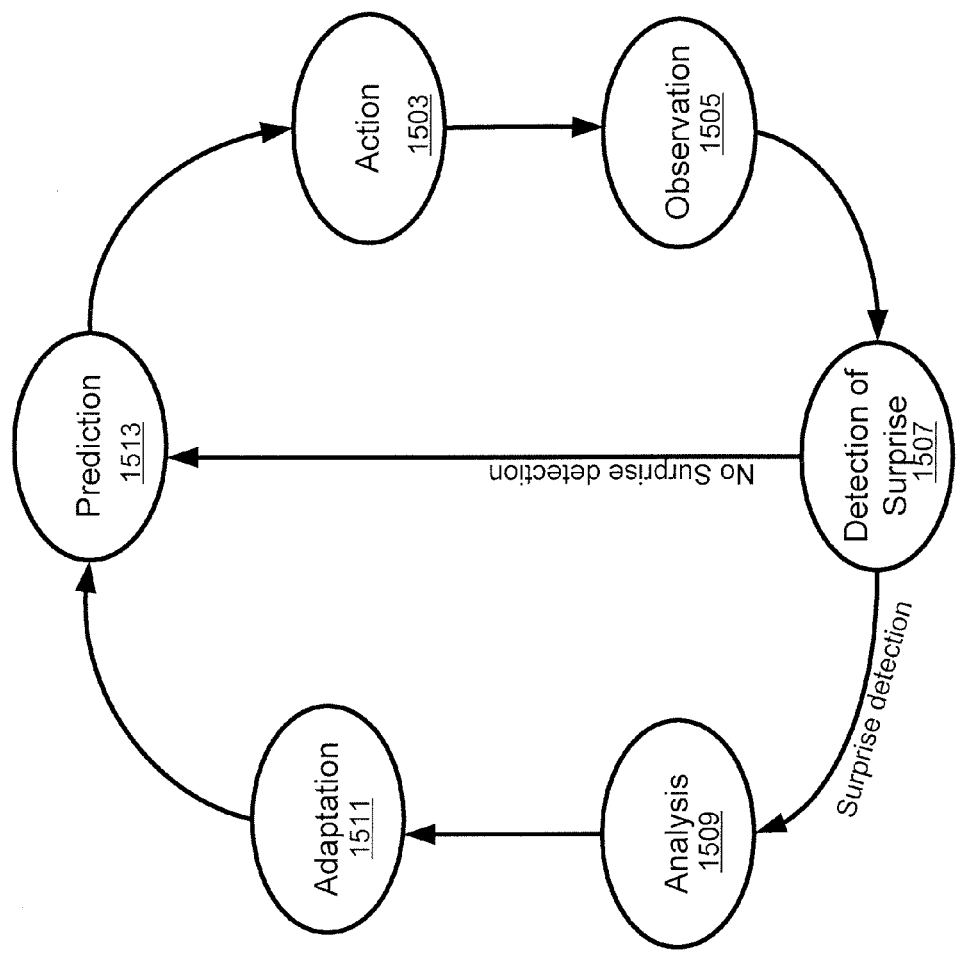
FIG. 15A is an example process diagram based on surprise based learning in accordance with certain aspects of the present disclosure.

As shown in FIG. 15A, the present disclosure may be built on modified SBL with differences in application specific assumptions and implementations. FIG. 15A is an example of a conceptual process diagram based on surprise based learning in accordance with certain aspects of the present disclosure. At 1503 and 1505. when an action is performed by an autonomous mobile node or its action and measurement data from one or more sensors onboard the autonomous mobile node are collected (or observed) and analyzed. At 1507, it is determined whether there exists a surprise based on present observation data and past observation data relating to the action of the autonomous mobile node. When it is determined that there exists a surprise, the process proceeds to analyze the surprise and adaption to the prediction is made, at 1509, 1511, 1513. On the other hand, when it is determined that there exists no surprise, the process proceeds to the prediction 1513.

In particular, based on modified SBL algorithms, the present disclosure (or BioAIM methodology) provides techniques and methodologies for autonomously monitoring actions of autonomous mobile nodes (or behaviors of a tentacle comprising at least one or more autonomous mobile nodes and an origin node), and detecting anomalies in the actions of the autonomous mobile nodes (or anomalies in the behavior of the tentacle). Thus, the BioAIM methodology may be referred to as "SBL based anomaly detection." Further, the BioAIM methodology may autonomously learns the relationships between various actions/behaviors and sensors on board one or more autonomous mobile nodes. That is, as noted above, measurement data may be collected from various sensors on board and the important information may then be stored as "learned knowledge" (or observation data) regarding relationships between the various actions/behaviors and the measurement data from the various sensors on board.

In the example, the learned knowledge may be stored in a prediction model including one or more prediction rules. In the present disclosure, the phrase "prediction rule" is used herein to describe how data from relevant sensors should change when an action (e.g., fly, etc.) of an autonomous mobile node (or behavior of a tentacle) is executed. Each prediction rule may contain a set of conditions, an action/behavior and a set of predictions, which may be determined in accordance with the following expressions (E1)-(E3):

Prediction Rule=Conditions→Action/Behavior→Predictions (E1)

Condition:(Entity,Attribute,Comparison Operator, Value) (E2)

Prediction:(Entity,Attribute,Change Indicator,Value) (E3)

As an example, when an action is occurring, conditions as expressed in (E2) are logic sentences describing the state of sensor data (or "observation data" or "measurement data") at a current time, while predictions as expressed in (E3) are logic sentences that describe expected change in the sensor data at a next sampled time. As noted above, the conditions of a prediction rule for an action may include one or more logical statements, each describing the state of an entity in an autonomous mobile node (or a tentacle) prior to the execution of the action. Further, a condition can be represented or expressed as a quadruple containing: an entity (e.g., an inertial measurement unit, etc.), a feature (e.g., velocity, etc.), a comparison operator (e.g., "=", "↑", "↓", "!=", etc.) and a comparison value (e.g., "0", "100", etc.) as shown in the expression (E2). In a condition when a comparison operator is applied to a feature of an entity, it provides a comparison against a value which qualifies the applicability of the associated rule.

The word "a prediction" or "predictions" used herein mean one or more logical clauses that describe the expected change in features of an entity as a result of performing an action. As seen in the expression (3) above, a prediction can be represented using a quadruple containing: an entity, a feature, a change indicator, and value, which indicates the change.

As an example, when an autonomous mobile node starts flying forward, its velocity should increase from zero. This action of the autonomous mobile node (e.g., action: flying forward) can be represented using the expressions E1-E3 as:

a prediction rule for flying forwarding action=Condition: (Inertial Measurement Unit, Velocity, =, 0)→Action: Forward→Prediction: (Inertial Measurement Unit, Velocity, ↑, X), where "↑" is a change indicator for an increase in velocity, and X is a numerical value for increased velocity.

This prediction rule means that for the forwarding action, when the autonomous mobile node starts moving from a stopped state (e.g., velocity=0), the inertial measurement unit will detect an increase in its velocity reading (e.g., velocity increases to X). Thus, this human readable format enables an operator to understand the autonomous mobile node's learned knowledge about the "forward" action.

In certain aspects of the present disclosure, the BioAIM methodology will monitor not only actions of individual autonomous mobile nodes but also behaviors of a networked system (or a tentacle comprising one or more autonomous mobile nodes) as a whole. Although the description as to monitoring the actions of individual autonomous mobile nodes are mostly presented herein, it will be apparent to one skilled in the relevant art to extend and apply to monitoring of the behaviors of a networked systems such as a tentacle comprising multiple wireless communication links by a plurality of autonomous mobile nodes.

Figure 15B:
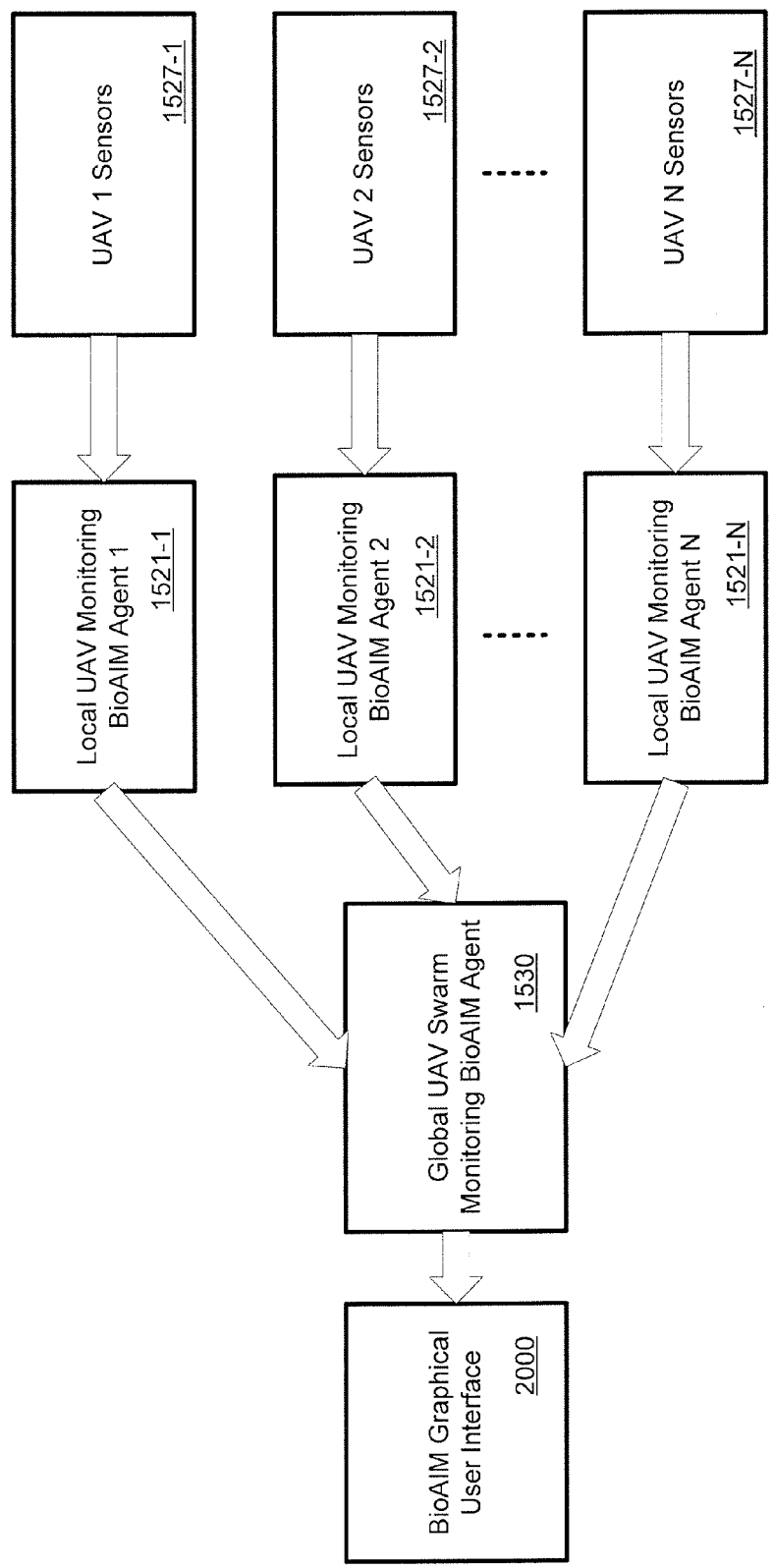
FIG. 15B illustrates a functional block diagram describing various interactions between one or more sensors on an autonomous mobile node and various components.

FIG. 15B illustrates a functional block diagram describing interactions among the plurality of autonomous mobile nodes, in an aspect of the present disclosure. In an aspect, as shown in FIG. 15B, there may be local and global agents installed in one or more autonomous mobile nodes. As one illustration, in FIG. 15B, each autonomous mobile node may be installed with and execute an instance of a local agent (e.g., a component embodying the disclosed technology with respect to an autonomous mobile node, Local UAV Monitoring BioAIM Agent 1521-1, 1521-2, . . . , or 1521-N). The local agent is responsible for monitoring actions of the autonomous mobile node by collecting various data from locally available sensors to ensure that the autonomous mobile node is performing as expected. Further, a global agent (e.g., a component embodying the disclosed technology with respect to a group of multiple autonomous mobile nodes or a tentacle, Global UAV Swarm Monitoring BioAIM Agent 1530) may be installed in one of multiple autonomous mobile nodes or in an origin node (e.g., the origin node 103, Node 1 as shown in FIG. 1) may periodically gather measurement data from sensors (e.g., UAV 1 Sensors 1527-1, UAV 2 Sensors 1527-2, . . . UAV N Sensors 1527-N) onboard the multiple autonomous mobile nodes deployed in the air to ensure that the overall behavior of the network or tentacle is performing as expected. Further, the global agent 1530 may be coupled to the graphical user interface (e.g., BioAIM Graphical User Interface 2000) to present monitoring results of one or more autonomous mobile nodes or the network to an operator. The GUI 2000 may be in the form of a graphical user interface depicted in FIG. 20. FIG. 15B illustrates various connections between local agents, the global agents and the GUI.

In the present disclosure herein, an action may be determined as a sequence of predefined actuator commands executed by an autonomous mobile node, while a behavior may be determined as a collection of actions issued to an entire system to accomplish a specific goal. For example, autonomous mobile nodes may have several actions, such as flying, hovering (in-place), etc., while the system may have several different behaviors, such as forming a tentacle, reinforcing the tentacle, and repairing the tentacle. Sensors on board each autonomous mobile node may report the status of the environment including the tentacle as well as itself to processor(s) or processing system(s) installed in the autonomous mobile node.

Figure 16:
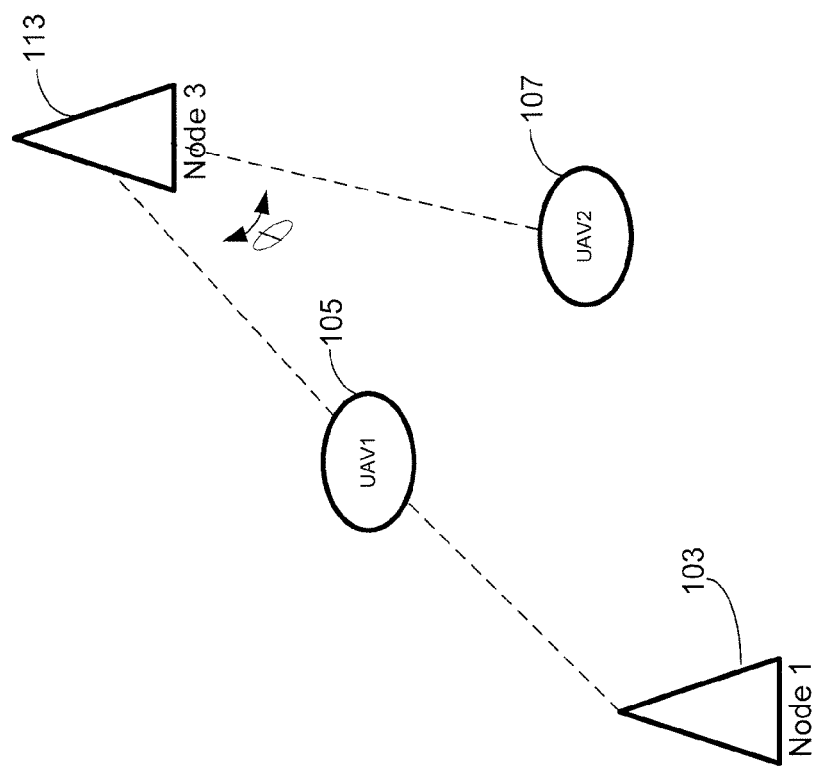
FIG. 16 illustrates an example learning a prediction model in accordance with certain aspects of the present disclosure.

In another aspect, an expected action of an autonomous mobile node or behavior of a tentacle may be learned during a priori training period from measurement data of successful exemplary actions and behaviors. In one implementation, the measurement data from the sensor(s) onboard the autonomous mobile node may include information, such as time, an autonomous mobile node's unique identification (ID), the autonomous mobile node's role and a state of a tentacle, of which the autonomous mobile node may be part. Additionally, as shown in FIG. 16, the present technology may compute a distance from an autonomous mobile node 105 (e.g., UAV1) to the destination (DD) 113 (e.g., Node 3), a neighboring autonomous mobile node's role (NR; highest if any, e.g., UAV2 107), and an angle θ formed between the neighboring autonomous mobile node 107 node and a straight line from the origin node 103 to the destination node 113. The above information can be used to validate various state transitions of the autonomous mobile nodes, while enforcing a human intuitive notion of roughly where the autonomous mobile nodes should be placed.

Figure 20:
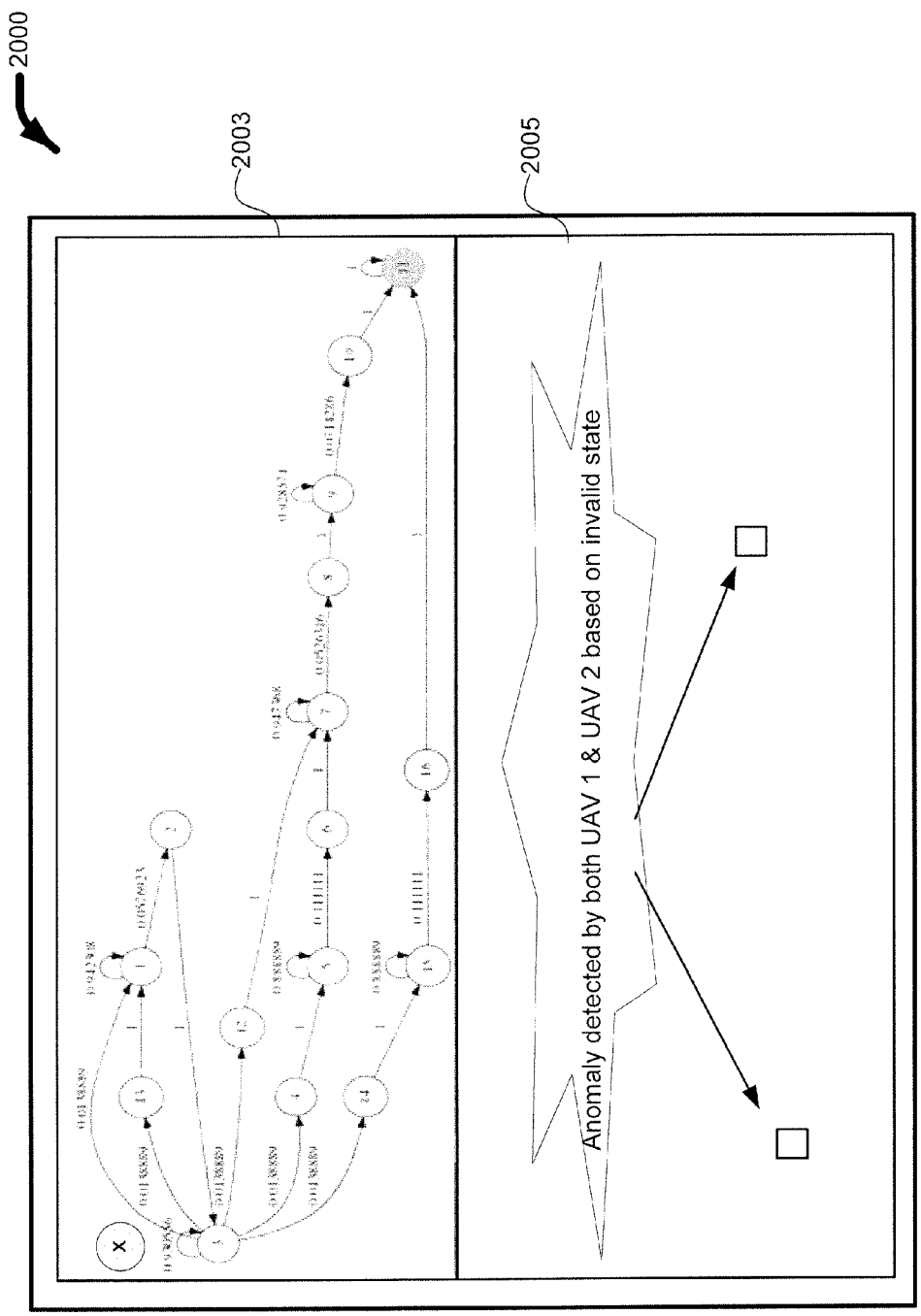
FIG. 20 is an example of a graphical user interface in accordance with certain aspects of the present disclosure.

Further, mathematically, a prediction rule can be represented as a conditional probability P(H|C,A), where H is a prediction, C is a condition, and A is an action or behavior. This probability represents a transition probability between states in a structured model, such as a Hidden Markov Model (HMM) or Automata, as shown in FIG. 20. In a learned structured model, each state may contain a set of related prediction rules learned from training trajectories of an autonomous mobile node because these rules were often witnessed together in training By learning the prediction rules and grouping them into different states for a structural model, the present technology may be called as a "structural model learning" method or technique that can construct a predictive and structured model from the continuous actions and measurement data from various sensors. The learned structured model also may help distinguish between discrepancies or surprises caused by noisy data and completely abnormal events based on probabilistic matching.

In the example, at predefined intervals various observations about an action of an autonomous mobile node can be made by recording all measurement data from sensors onboard the autonomous mobile node. The measurement data can be transmitted to a certain autonomous mobile node which may be designated and acting as a central node in the SBL based anomaly detection. Alternatively, the SBL based anomaly detection may be implemented in an origin node (e.g., a node on the ground) and the measurement data from all the autonomous mobile nodes deployed can be transmitted to the origin node at certain intervals. The interval can be as short as processing and communication times permit (i.e., every few seconds), or as long as it takes for significant changes to occur onboard each of the autonomous mobile nodes (i.e., every few hours). The interval may be preconfigured or may be configured dynamically during flight.

Figure 17:
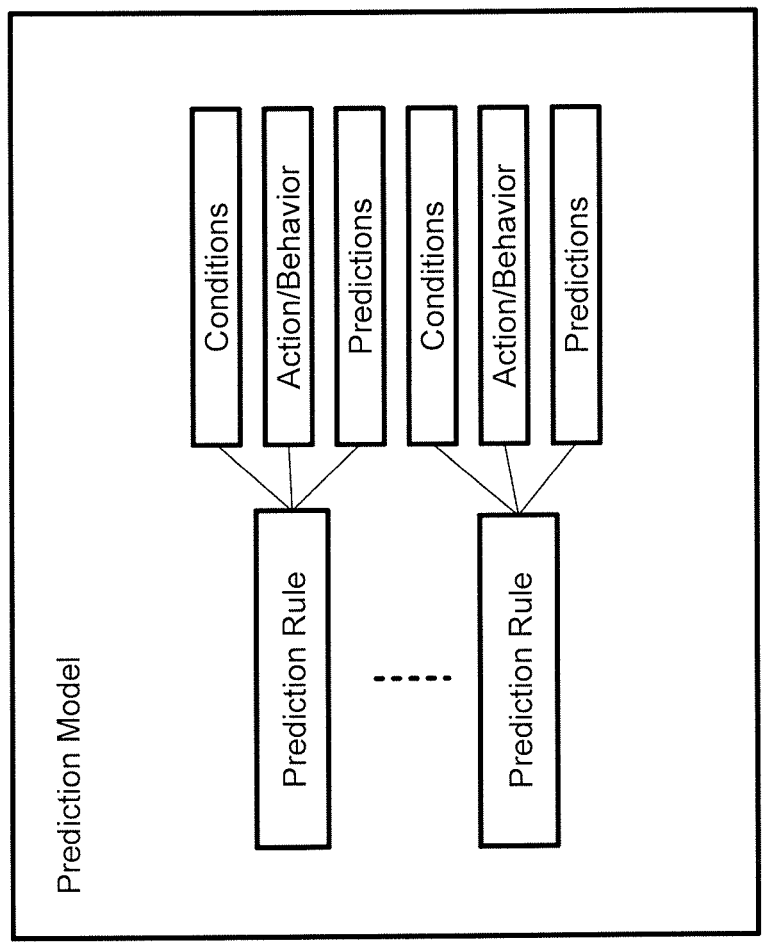
FIG. 17 illustrates an example of a prediction model in accordance with certain aspects of the present disclosure.
Figure 18:
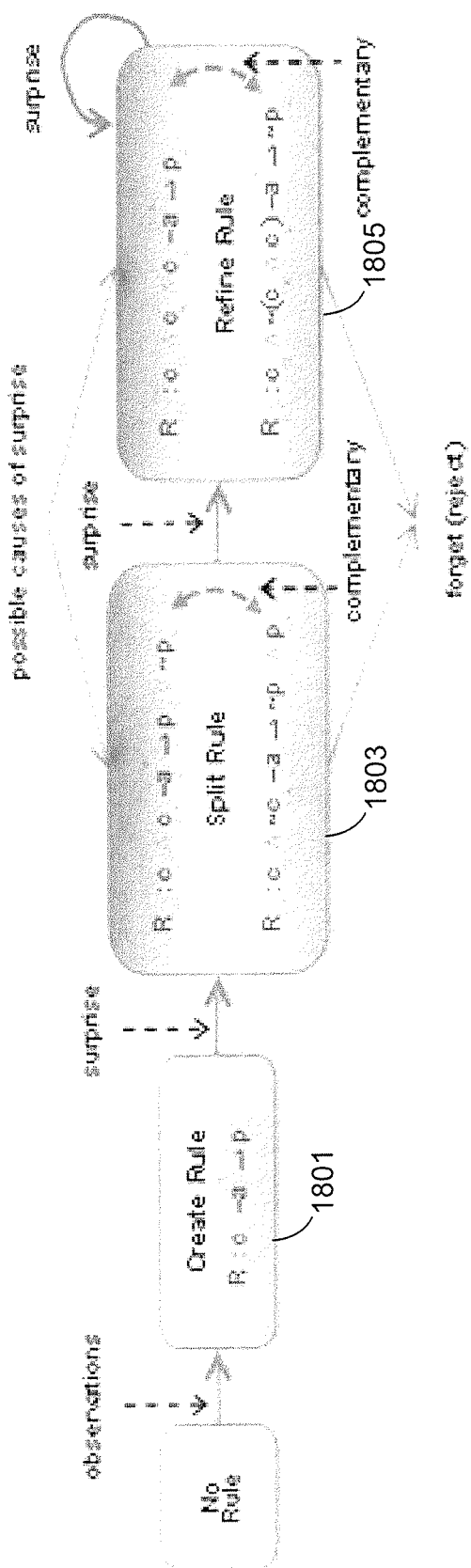
FIG. 18 is an example of a life cycle of a prediction rule in accordance with certain aspects of the present disclosure.

FIGS. 17 and 18 illustrate an example of a prediction rule and an example of a life cycle of the prediction rule. As illustrated in FIG. 17, a prediction rule may include conditions, action/behavior, and predictions. Also, as shown in FIG. 18, the prediction rule may go through different stages, such as creation, split, and refinement. When learning a prediction model from scratch, there is no predicted outcome for an action being executed by an autonomous mobile node. If the prediction model has been learned, there will be a prediction describing expected observation at a next time interval for an action performed by the autonomous mobile node. When the action is performed, a new observation on the action by the autonomous mobile node is made at the next time interval by using one or more sensors onboard the autonomous mobile node. Further, if there was no prediction, the present disclosure will compare past and present observations with a set of predefined comparison operators (e.g., presence, absence, >, <, =, etc.) and update its prediction model by creating a set of prediction rules that capture any changes based on the comparison of the present and past observation data for the action of the autonomous mobile node. That is, given a prediction, the SBL based anomaly detection may use these comparison operators to check for any discrepancies or surprises between the current and expected observation data (e.g., measurement data from the one or more sensors onboard the autonomous mobile node). If there is no surprise, the cycle repeats, and if there is a surprise, the prediction model is updated through surprise analysis and rule maintenance to improve future predictions, which are described below.

Surprise analysis attempts to identify the cause of each surprise by comparing two similar observations in the past as described in an article "Autonomous Surveillance Tolerant to Interference," N. Ranasinghe and W- M Shen, Towards Autonomous Robotics Systems Conference, TAROS 2012, August 2012, which is incorporated herein by reference in its entirety. In the present disclosure, the SBL based anomaly detection assumes that there will be sufficient data to identify a discernable correlation for a surprise, yet in the event of encountering a hidden cause the SBL based anomaly detection will record the entire observation to improve its prediction accuracy.

Further, in an aspect, rule maintenance will use these potential causes to update the prediction model accordingly. As shown in FIG. 18, the rule maintenance may include three components responsible for creating new rules 1801, splitting an existing rule once 1803, and refining them thereafter 1805. In the SBL based anomaly detection, when a rule is surprised for the first time, it will be split into two complementary "sibling" rules by appending a possible cause from surprise analysis. One sibling rule is specialized and the other sibling rule is generalized, and together they capture both the original and surprised results. However, if the surprised rule already has a sibling, then both sibling rules will be refined together based on the identified causes of the surprise so that the revised rules may predict more successfully in the future. Of course, not all revised rules are improving, and it is possible that the revised sibling rules would describe a contradiction or encounter a large number of surprises consecutively during execution. Such sibling rules will be marked as obsolete and become inactive in predicting and further learning. Precise details of this complex process may be found in a doctoral thesis, "Learning to Detect and Adapt to Unpredicted Changes," N. Ranasinghe, Doctoral Dissertation, University of Southern California, August 2012, which is incorporated herein by reference in its entirety.

Further, by using the predictions of one rule to satisfy the conditions of another rule, it is possible to string a sequence of prediction rules and forecast the predicted observation at a future point in time. As noted above, surprises may occur when there are discrepancies between the prediction and the observation, yet some surprises are more important to detect and adapt to than others. For example, sensor noises may cause surprises, but the sensor noises are less important than complete sensor failures. Thus, to quantify a magnitude of a surprise or divergence from the norm, the present technology may learn structured models when the prediction model for a given action or behavior yields no further surprises.

Figure 19:
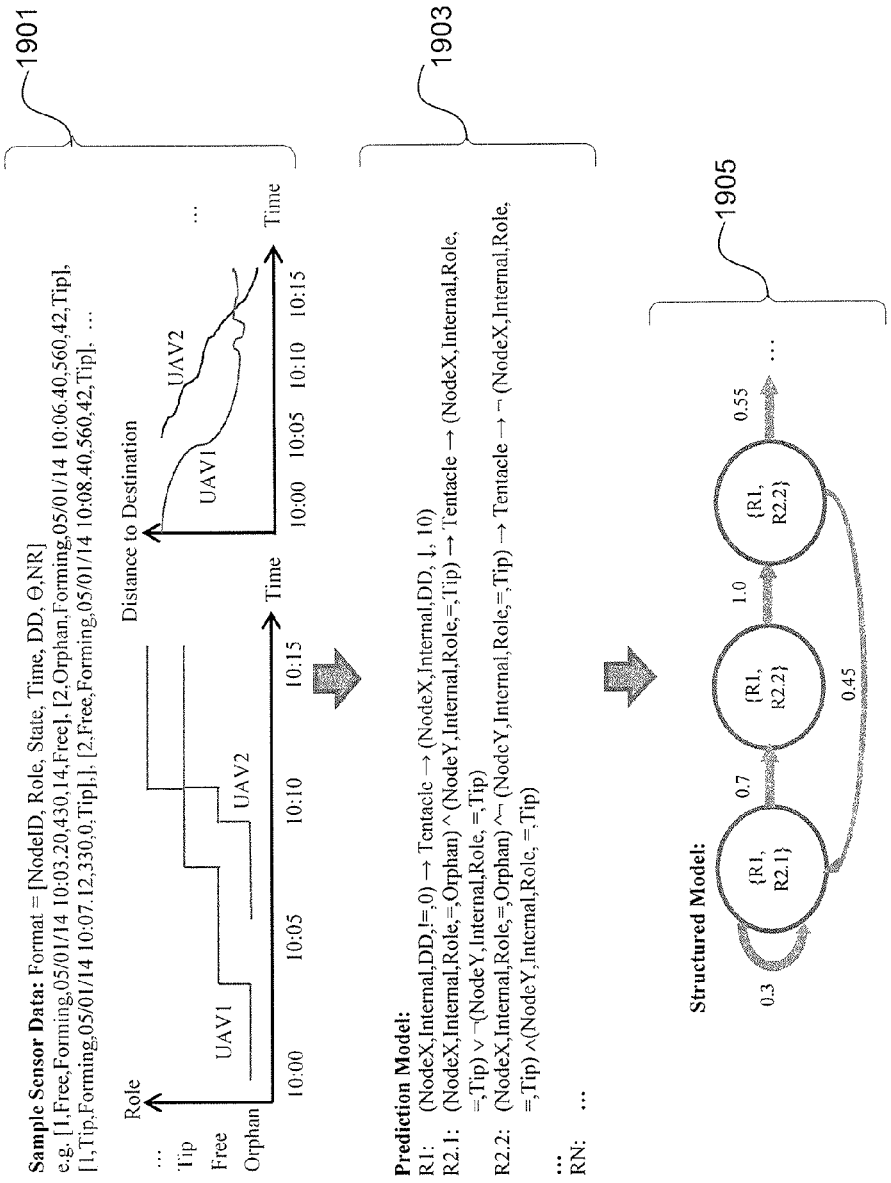
FIG. 19 is an example of learning a prediction model and a structured model in accordance with certain aspects of the present disclosure.

FIG. 19 depicts an example of learning a structured model from a learned prediction model, in an aspect of the present disclosure. This structured model may return the validity of the observed state or state sequence with respect to the predicted state or state sequence, as a number between 0.0 and 1.0 using a special similarity metric. This similarity metric is designed to be more accurate than forward-backward log-likelihood estimation in the presence of noisy or missing data at comparing a sequence of observations against the learned sequence of state transitions.

The measurement data (e.g., data in the example form of Sample Sensor Data shown in FIG. 19) may be received from the one or more sensors on board the autonomous mobile node. Alternatively, in addition, the measurement data may be periodically received via messages at an origin node from one or more autonomous mobile nodes deployed in a tentacle. In one implementation, each message may include information such as a timestamp of a transmitting autonomous mobile node, a unique identifier of the transmitting autonomous mobile node, a role of the transmitting autonomous mobile node in a tentacle, a state of the tentacle, a calculated distance to a destination node, the neighboring autonomous mobile node's role, and an angle formed between the autonomous mobile node and a straight line from the origin node to the destination node. The example graphs shown in FIG. 19 may help visualize this data to depict complex relationships between certain elements of the data. For example, the graph on the left of 1901 depicts how the roles of two autonomous mobile nodes, such as UAV 1 and UAV 2, change with respect to each other over a period of time. The graph on the right of 1901 depicts how the distance to the destination of each autonomous mobile node (e.g., UAV 1 or UAV 2) changes over a period of time. Also, alternatively, the relationships between the role and distance can be plotted. The present technology, however, learns such relationships autonomously, based on measurement data from one or more sensors on board the two autonomous mobile nodes, such as UAV 1 and UAV 2.

As depicted in FIG. 19, following the processes visualized in FIGS. 15A and 18, the present technology may sample the measurement data periodically and learn a prediction model similar to the one shown in FIG. 19, e.g., R1, R2.1, R2.2, . . . RN at 1903. The prediction model may effectively identify and capture the relationships described earlier in the form of prediction rules. For example, in FIG. 19, R1 captures some of the distance relationship, while rules R2.1 and R2.2 capture the role relationships, as shown at 1903. These rules are predictive because they can forecast expected observations of executing an action or a behavior based on a few previously observed patterns (or sets of measurement data from on board sensors), even in precise situations which may not have been observed before. For example, the measurement data may be used to predict how the roles transition in the presence of two autonomous mobile nodes, such as UAV 1 and UAV 2. In addition, the present technology may also correctly predict how the roles transition when three autonomous mobile nodes are participating. Thus, during the training phase, the present technology (or the SBL based anomaly detection) will continue to improve the learned prediction model until there are no further surprises or the surprises are within predefined acceptable thresholds.

When the learned prediction model is acceptable, measurement data from various successful training scenarios may be applied to the prediction model for the purpose of extracting states and state transitions. For example, in a corresponding structural model, there may be two states: state 1 and state 2. In FIG. 19, at 1903 and 1905, the state 1 may be identified by rules R1 and R2.1 firing simultaneously, while the state 2 may occur only when rules R1 and R2.2 fire together. So, this means that if rules R1 and R2 are currently observed the next observation could be the same state 1 with a probability of 0.3 or it could be state 2 with a probability of 0.7, as shown at 1905. However, if the state 1 was observed after the state 2, then this would be an anomaly based on the trained data. Similarly, if R2.1 and R2.2 are fired together, it would define an unknown state, which would also be flagged as an anomaly and be alerted to the operator. The calculation of the similarity metric quantifies the likelihood of a state transition or a sequence of state transitions being valid (e.g., 1.0) or anomalous (e.g., 0.0). Further, in the example, an alert may be generated and sent to the origin node (or an operator location), via the tentacle established with the origin node, by the autonomous mobile node such that the alert can be displayed to the operator using various means including visual and/or audible messages on the operator console, as shown in FIG. 20.

As noted above, in another aspect, during the training phase the present technology may learn a prediction model for each valid behavior of each autonomous mobile node from synthetically generated data created manually or based on abstractions of the real data. The requirement for this abstraction is to eliminate any noise in real sensor data (e.g., measurement data from sensors on board), which ensures that the present technology learns an accurate prediction model devoid of errors introduced by noisy data. Extracting a good prediction model from noisy data would require a large number of varied training examples, resulting in much longer training durations. Once a prediction model is learned it is applied to sequences of real sensor data from one or more successful demonstrations of the action or behavior so as to learn a corresponding structured model. Training with real data ensures that the structured model captures the statistical probabilities of being in a particular state and transitioning to another. When in operation the present technology will monitor the sensor data by testing applicable models at regular time intervals, and provide an alert (e.g., visual or audible messages or any combination thereof) to the operator when the similarity metrics drop below acceptable thresholds for valid actions or behaviors. These thresholds can be recorded and selected by training on several successful and unsuccessful variants of possible deployments of autonomous mobile nodes and one or more tentacles. As noted above, in one implementation, data containing information on the alert may be sent to the operator console via the one or more tentacles established with the origin node, and an alert message may be highlighted on the GUI, by changing the color of anomalous autonomous mobile nodes to red, and/or the anomalous autonomous mobile node may be marked with an invalid transition "X" in the visualized structure model, as shown in FIG. 20.

Furthermore, the following pseudocode illustrates example processes of the present technology.

[Pseudocode]
Observe the environment via sensors to initialize observations
Do
    Get the desired goal observation with the highest probability or directly

```
        If goal is NULL
              Choose a random action
        Else
              If plan is NULL
                    Find a plan as a sequence of rules that will lead to the goal
              End If
              Select next action from the plan
        End if
  predictionRules = Match the current observations and select the matching
  prediction rules which forecast the outcome of this action
        Execute selected action
        Observe the environment via sensors
        If predictionRules is NULL
              Create unique prediction rules using entity & attribute relevance
        Else
              For each rule in predictionRules
                    If the outcome does not match the prediction
                          Reject the rule based on success probability
                          If the rule is not rejected
                                Perform surprise analysis to get a list of possible
                                causes
                                For each possible cause
                                      If the rule has not been split before
                                            Create a pair of complementary rules by
  including the possible cause
                                      Else
                                            Refine the complementary pair of rules
  by including the possible cause
                                      End If
                                End for
                          End If
                    End If
              End For
              If all predictionRules do not forecast a change in the observation
              or are rejected
                    Create unique prediction rules using entity & attribute
                    relevance
              End If
        End If
  While true
```

FIG. 20 illustrates an example implementation of a graphical user interface (GUI) in accordance with certain aspects of the present disclosure. The primary focus of the GUI 2000 is to provide an operator with an appropriate amount of information when an anomaly occurs. The top half of the interface 2003 is configured to present a graphical representation of the structured model (the visualized structured model) autonomously learned by the present technology. Note that there are no transitions in or out of invalid states such as the one marked as "X". That is, for the autonomous mobile node, anomaly in its behavior has been detected and it is put in its invalid state marked as "X" in its structured model. In the visualized structured model, each numbered circle represents a known state, which a local agent or global agent could be experiencing at any particular point in time. The number on each arrow indicates the learned transition probability to the next state identified by a tip of an arrow. Additionally, or alternatively, messages concerning detected anomalies may be overlaid on the bottom half of the interface 2005, which is also visualizing a topographical map identifying the locations of autonomous mobile nodes and their wireless connectivity.

As noted above, various functions or operations relating to the BioAIM methodology as well as BioAIR methodology may be implemented in one or more processors running in various nodes including one or more autonomous mobile nodes. As noted above, and as well known in the art, a general purpose computer typically comprises a central processor or other processing device, an internal communication bus, various types of memory or storage media (RAM, ROM, EEPROM, cache memory, disk drives, etc.) for code and data storage, one or more network interface cards or ports for communication purposes. The software functionalities involve programming, including executable code as well as associated stored data, e.g., files used for implementing various operations including operations or functionalities described herein (e.g., monitoring and controlling autonomous mobile nodes as in BioAIR methodology and various aspects of the SBL based anomaly detection as in BioAIM methodology) in accordance with the present disclosure. The software code may relate to a client or a server or network element functions and may be executable by a general purpose computer platform. In operation, as noted above, the code is stored in a non-transitory machine readable storage medium within the general purpose computer platform. However, at other times, the software may be stored at other locations and/or transported for loading into an appropriate general purpose computer system for execution. For example, the software may be stored in a central location or a device on the ground (e.g., an origin node) and wirelessly transferred to one or more autonomous mobile nodes deployed in the air and then be executed thereafter. For example, each of the autonomous mobile nodes may be pre-installed with software components relating to the BioAIM and/or BioAIR methodology prior to the deployment for a mission. Alternatively, the BioAIM and/or BioAIR methodology may be wirelessly transferred to the one or more autonomous mobile nodes from a third location such as an origin node. Software code for applications or other programming relating to operations and/or functionalities disclosed herein may also be stored in a server and transmitted through a network for storage in memories of a client, and be transferred to the original node and/or the one or more autonomous mobile nodes (either prior to deployment or during or after the deployment for a mission).

In another variation, the method and system in accordance with certain aspects of the present disclosure may operate in a stand-alone environment, such as on a single autonomous mobile node or a ground node. In another variation, the method and system in accordance with certain aspects of the present disclosure may operate in a client-server environment or in a distributed computing environment over multiple computing platforms including processing systems embodied in multiple autonomous mobile nodes.

It is to be understood that the specific order or hierarchy of steps in the methods disclosed herein is an illustration of example processes. It is understood that the specific order or hierarchy of steps in the methods may be rearranged. Various steps of the accompanying method claims are presented in a sample order and thus are not meant to be limited to the specific order or hierarchy presented herein unless stated otherwise.

The illustrations and examples provided herein are for explanatory purposes and are not intended to limit the scope of the appended claims. The present disclosure is to be considered an example embodiment of one or more inventive concepts and is not intended to limit the spirit and scope of the invention and/or claims of the example illustrated. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. All structural and functional equivalents to the elements of the various aspects described throughout this disclosure that are known or later come to be known to those of ordinary skill in the art are expressly incorporated herein by reference and are intended to be encompassed by the claims. Further, nothing disclosed herein is intended to be dedicated to the public regardless of whether such disclosure is explicitly recited in the claims. It is also noted that no claim element is to be construed under 35 U.S.C. §112, 6th paragraph, or 35 U.S.C. §112(f), whichever is appropriate, unless the claim element is expressly recited using the phrase "means for" or "step for" (as in the case of a method claim).

Further, while there has been illustrated and/or described what are presently considered to be example features, it will be apparent to those skilled in the art that various other modifications may be made and/or equivalents may be substituted, without departing from claimed subject matter. Additionally, many modifications may be made to adapt a particular situation to the teachings of claimed subject matter without departing from the concept(s) described herein. Thus, the claimed subject matter is intended to be not limited to the particular examples disclosed herein, but that such claimed subject matter may also include all aspects falling within appended claims and/or equivalents thereof.

Various embodiments have been described herein, and the descriptions of the various embodiments are intended to be illustrative and are not intended to be limiting. Various modifications and applications may be made by those skilled in the relevant art, without departing from the scope of the appended claims.

What is claimed is:

1. A method for detecting an anomaly in behavior of an airborne autonomous mobile node, the method comprising:
    determining a predictive model for an action of the airborne autonomous mobile node, based on measurement data from one or more sensors onboard the airborne autonomous mobile node; and
    based on the determined predictive model, detecting the anomaly in the action of the airborne autonomous mobile node,
    wherein determining the predictive model for the action of the airborne autonomous mobile node comprises:
    receiving the measurement data from the one or more sensors onboard the airborne autonomous mobile node, the measurement data being related to the action of the airborne autonomous mobile node when the airborne autonomous mobile node performs the action;
    storing the received measurement data as present observation data about the action of the airborne autonomous mobile node;
    determining a prediction rule for the action of the airborne autonomous mobile node, based on the received measurement data, the prediction rule comprising a condition, an action, and a prediction;
    determining whether there exists a first prediction about the action of the airborne autonomous mobile node;
    when it is determined that there exists a first prediction about the action of the airborne autonomous mobile node, determining whether there exists a surprise between the present observation data and expected observation data relating to the action of the airborne autonomous mobile node, the surprise comprising a difference between the present observation data and the expected observation data;
    upon determining that the surprise exists between the present observation data and the expected observation data, identifying a potential cause for the surprise based on previous observations; and
    updating the predictive model based on the identified potential cause of the surprise.

2. The method of claim 1, wherein the airborne autonomous mobile node comprises an unmanned aerial vehicle (UAV) or a group of unmanned aerial vehicle (UAVs).

3. The method of claim 1, further comprising:
    when it is determined that there exists no first prediction about the action of the airborne autonomous mobile node:
    comparing the present observation data and past observation data to determine a change between the present observation data and the past observation data,
    creating a prediction rule for the action of the airborne autonomous mobile node based on the change, and
    updating the predictive model of the action of the airborne autonomous mobile node with information on the created prediction rule.

4. The method of claim 1, wherein the action of the airborne autonomous mobile node comprises a sequence of predefined actuator commands executed by the airborne autonomous mobile node.

5. The method of claim 1, further comprising:
    upon detecting the anomaly in the action of the airborne autonomous mobile node, sending an alert indicating the anomaly in the action of the autonomous mobile node, via a tentacle comprising a communication device, for presenting an alert message to an operator.

6. The method of claim 1, wherein the predictive model comprises a prediction model and a structured model.

7. The method of claim 6, further comprising:
    updating the prediction model by refining or creating prediction rule based on the identified potential cause of the surprise, and
    updating the structured model by grouping prediction rules that fire together.

8. An apparatus for detecting an anomaly in a behavior of an airborne autonomous mobile node, the apparatus comprising:
    a communication device;
    a memory; and
    at least one processor coupled to the memory and configured to:
    determine a predictive model for an action of the airborne autonomous mobile node, based on measurement data from one or more sensors onboard the autonomous mobile node; and
    based on the determined predictive model, detect the anomaly in the action of the airborne autonomous mobile node,
    wherein the at least one processor is further configured to:
    receive the measurement data from the one or more sensors onboard the airborne autonomous mobile node, the measurement data being related to the action of the airborne autonomous mobile node when the airborne autonomous mobile node performs the action;
    store the received measurement data as present observation data about the action of the airborne autonomous mobile node;
    determine whether there is a first prediction rule for the action of the airborne autonomous mobile node, based on the received measurement data, the first prediction rule comprising a condition, an action, and a prediction;

determine whether there exists a prediction about the action of the airborne autonomous mobile node;

when it is determined that there exists a prediction about the action of the airborne autonomous mobile node, determine whether there exists a surprise between the present observation data and expected observation data relating to the action of the airborne autonomous mobile node, the surprise comprising a difference between the present observation data and the expected observation data;

upon determining that the surprise exists between the present observation data and the expected observation data, identify a potential cause of the surprise based on past observations data; and update the predictive model based on the identified potential cause of the surprise.

9. The apparatus of claim 8, wherein the airborne autonomous mobile node comprises an unmanned aerial vehicle (UAV) or a group of unmanned aerial vehicle (UAVs).

10. The apparatus of claim 8, wherein the at least one processor is further configured to:

when it is determined that there exists no prediction about the action of the airborne autonomous mobile node:

compare the present observation data and the past observation data to determine a change between the present observation data and the past observation data, create the first prediction rule for the action of the airborne autonomous mobile node based on the change, and update the predictive model of the action of the airborne autonomous mobile node with information about the potential cause of the surprise.

11. The apparatus of claim 8, wherein the action of the airborne autonomous mobile node is a sequence of predefined actuator commands executed by the airborne autonomous mobile node.

12. The apparatus of claim 8, wherein the at least one processor is further configured to, upon detecting the anomaly in the action of the airborne autonomous mobile node, sending an alert indicating the anomaly in the action of the airborne autonomous mobile node, via a tentacle comprising a communication device, for presenting an alert message to an operator.

13. The apparatus of claim 8, wherein the predictive model comprises a prediction model and a structured model.

14. The apparatus of claim 13, further comprising:

updating the prediction model by refining or creating prediction rule based on the identified potential cause of the surprise, and updating the structured model by grouping prediction rules that fire together.

15. A non-transitory computer readable medium storing computer executable code therein for detecting an anomaly in behavior of an airborne autonomous mobile node, comprising:

code for causing a computer to determine a predictive model for an action of the airborne autonomous mobile node, based on measurement data from one or more sensors onboard the airborne autonomous mobile node;

code for causing the computer to, based on the determined predictive models, detect the anomaly in the action of the airborne autonomous mobile node;

code for receiving the measurement data from the one or more sensors onboard the airborne autonomous mobile node, the measurement data being related to the action of the airborne autonomous mobile node when the airborne autonomous mobile node performs the action;

code for storing the received measurement data as present observation data about the action of the airborne autonomous mobile node;

code for determining whether there is a first prediction rule for the action of the airborne autonomous mobile node, based on the received measurement data, the first prediction rule comprising a condition, an action, and a prediction;

code for determining whether there exists a prediction about the action of the airborne autonomous mobile node;

code for, when it is determined that the prediction exists about the action of the airborne autonomous mobile node, determining whether a surprise exists between the present observation data and expected observation data relating to the action of the airborne autonomous mobile node, the surprise comprising a difference between the present observation data and the expected observation data;

code for, upon determining that the surprise exists between the present observation data and the expected observation data, identifying a potential cause of the surprise based on previous observations data; and code for updating the predictive model based on the identified potential cause of the surprise.

16. The non-transitory computer readable medium of claim 15, wherein the airborne autonomous mobile node comprises an unmanned aerial vehicle (UAV) or a group of unmanned aerial vehicle (UAVs).

17. The non-transitory computer readable medium of claim 15, further comprising:

code for causing the computer to receive the measurement data from the one or more sensors onboard the airborne autonomous mobile node, the measurement data being related to the action of the airborne autonomous mobile node when the airborne autonomous mobile node performs the action;

code for causing the computer to store the received measurement data as the present observation data about the action of the airborne autonomous mobile node; and code for causing the computer to determine a first prediction rule for the action of the airborne autonomous mobile node, based on the received measurement data, the first prediction rule comprising a condition, an action, and a prediction.

18. The non-transitory computer readable medium of claim 15, further comprising:

code for causing the computer to, upon detecting the anomaly in the action of the airborne autonomous mobile node, send an alert indicating the anomaly in the action of the airborne autonomous mobile node, via a tentacle comprising a communication device, for presenting an alert message to an operator.

19. The non-transitory computer readable medium of claim 15, wherein the predictive model comprises a prediction model and a structured model.

20. The non-transitory computer readable medium of claim 19, further comprising:

updating the prediction model by refining or creating prediction rule based on the identified potential cause of the surprise, and updating the structured model by grouping prediction rules that fire together.

* * * * *